(12) United States Patent
Matsuda et al.

(10) Patent No.: US 8,151,754 B2
(45) Date of Patent: Apr. 10, 2012

(54) AIR-INTAKE DUCT AND AIR-INTAKE STRUCTURE

(75) Inventors: Yoshiharu Matsuda, Akashi (JP);
Takafumi Matsumoto, Himeji (JP);
Naoki Yokoyama, Takasago (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 325 days.

(21) Appl. No.: 12/559,356

(22) Filed: Sep. 14, 2009

(65) Prior Publication Data

US 2010/0108010 A1    May 6, 2010

(30) Foreign Application Priority Data

Sep. 16, 2008 (JP) ................................. 2008-236788
Sep. 17, 2008 (JP) ................................. 2008-238318

(51) Int. Cl.
*F02M 35/10* (2006.01)

(52) U.S. Cl. .......... 123/184.52; 123/184.53; 123/184.59

(58) Field of Classification Search ............. 123/184.21, 123/184.26, 184.27, 184.36, 184.37, 184.44, 123/184.45, 184.47, 184.48, 184.49, 184.52, 123/184.53, 184.56, 306
See application file for complete search history.

(56) References Cited

U.S. PATENT DOCUMENTS

| 4,191,140 | A | * | 3/1980 | Matsumoto et al. ..... 123/184.42 |
| 4,481,922 | A | * | 11/1984 | Sugiura ......................... 123/306 |
| 4,726,340 | A | * | 2/1988 | Hasegawa et al. ............ 123/432 |
| 4,779,594 | A | * | 10/1988 | Oda et al. ....................... 123/432 |
| 4,794,885 | A | * | 1/1989 | Honda et al. .............. 123/184.43 |
| 4,829,942 | A | * | 5/1989 | Ampferer ................. 123/184.37 |
| 4,854,271 | A | * | 8/1989 | Miyano et al. ........... 123/184.31 |
| 4,889,082 | A | * | 12/1989 | Hitomi et al. ............ 123/184.31 |
| 4,907,547 | A | * | 3/1990 | Daly ......................... 123/184.53 |
| 4,930,468 | A | * | 6/1990 | Stockhausen ............. 123/188.14 |
| 5,005,532 | A | * | 4/1991 | Shillington .............. 123/184.42 |
| 5,009,200 | A | * | 4/1991 | van Basshuysen et al. ....................... 123/184.52 |
| 5,081,974 | A | * | 1/1992 | Chikamori et al. ........... 123/478 |
| 5,267,543 | A | * | 12/1993 | Novak et al. .................. 123/306 |
| 5,596,966 | A | * | 1/1997 | Elder ............................ 123/337 |
| 5,937,815 | A | * | 8/1999 | Hidaka .................... 123/184.56 |
| 5,947,072 | A | * | 9/1999 | Loy et al. ................. 123/184.56 |
| 6,105,545 | A | * | 8/2000 | Breidenbach ............ 123/184.56 |
| 6,450,141 | B1 | * | 9/2002 | Sakuma ................... 123/184.57 |
| 6,637,396 | B2 | * | 10/2003 | Katayama ................ 123/184.42 |
| 7,240,661 | B2 | * | 7/2007 | Nagano et al. ................ 123/301 |
| 7,469,671 | B2 | * | 12/2008 | Atsumi .................... 123/184.53 |
| 7,802,555 | B2 | * | 9/2010 | Maeda .......................... 123/306 |
| 2009/0272355 | A1 | * | 11/2009 | Nogawa ................... 123/184.55 |

FOREIGN PATENT DOCUMENTS

JP    2006-090298    4/2006

* cited by examiner

*Primary Examiner* — Thomas Moulis
(74) *Attorney, Agent, or Firm* — Alleman Hall McCoy Russell & Tuttle LLP

(57) ABSTRACT

An air-intake duct of the present invention, configured to guide air to a throttle device coupled to an engine, includes a main wall forming a main passage; and a sub-wall provided outside the main wall to form a sub-passage; wherein the sub-wall has a height smaller than a height of the main wall; and wherein the sub-passage is defined by an inner wall surface of the sub-wall and an outer wall surface of the main wall and is disposed on one side in a direction substantially perpendicular to a passage axis of the main passage.

13 Claims, 16 Drawing Sheets

AIR-INTAKE DUCT AND AIR-INTAKE STRUCTURE

CROSS REFERENCE TO RELATED APPLICATION

This application claims priority to and the benefit of Japanese Patent Application No. 2008-236788 filed on Sep. 16, 2008, and Japanese Patent Application No. 2008-238318 filed on Sep. 17, 2008, the entire disclosures of which are incorporated herein by reference.

BACKGROUND ART

1. Field of the Invention

The present invention relates to an air-intake duct and an air-intake structure for guiding air to a throttle device coupled to an engine.

2. Description of the Related Art

As disclosed in, for example, Japanese Laid-Open Patent Application Publication No. 2006-90298, a so-called double injector engine including two fuel injectors in an air-intake passage is known as a high driving power engine mounted in a motorcycle or the like. One of the fuel injectors is attached to a throttle device at a downstream side of a throttle valve, while the other fuel injector is attached to an air cleaner box to inject a fuel to an upstream region of an air-intake duct provided at an upstream side of the throttle device. The air-intake duct is disposed to protrude into an inner space of the air cleaner box toward the injector to suction a fuel injected from an upstream injector.

However, air in the vicinity of an outer wall surface of the air-intake duct is not smoothly suctioned into the air-intake duct through an upstream opening due to the presence of the outer wall surface. In the case where the air-intake duct is disposed to protrude into the inner space of the air cleaner box, air tends to be stagnant in a region defined between the outer wall surface of the air-intake duct and the inner wall surface of the air cleaner box. This results in reduced air-intake efficiency, making it difficult to improve an engine driving power characteristic. On the other hand, if the size of the air-intake duct is increased, the passage cross-sectional area of the air-intake passage is increased and the air-intake efficiency is improved. However, since the motorcycle or the like has a limited vehicle body width, it is undesirable to increase the size of the component mounted therein.

SUMMARY OF THE INVENTION

The present invention has been made under the circumstances, and an air-intake duct of the present invention, configured to guide air to a throttle device coupled to an engine, comprises a main wall forming a main passage; and a sub-wall provided outside the main wall to form a sub-passage; wherein the sub-wall has a height smaller than a height of the main wall; and wherein the sub-passage is defined by an inner wall surface of the sub-wall and an outer wall surface of the main wall and is disposed on one side in a direction substantially perpendicular to a passage axis of the main passage.

In accordance with the configuration, since the sub-wall having a smaller height is provided outside the main wall forming the main passage and the sub-passage is formed to extend along the outer wall surface of the main wall, air present in an outside region of the main wall of the air-intake duct can be suctioned through the sub-passage. In addition, since the sub-passage is not provided on the entire outer periphery of the main passage but is provided on one side of the main passage, the passage cross-sectional area of the air-intake passage can be increased without increasing a lateral width of the air-intake duct, as viewed from one side. Therefore, air-intake efficiency can be improved without increasing the size of the air-intake passage.

In an air-intake structure of the present invention for guiding air from inside an air cleaner box to a throttle device coupled to an engine via the above-mentioned air-intake duct, the main wall and the sub-wall of the air-intake duct protrude into an inner space of the air cleaner box; a protruding amount of the sub-wall into the inner space is smaller than a protruding amount of the main wall into the inner space; and the air-intake duct is disposed such that the sub-passage is located closer to an air cleaner element inside the air cleaner box than the main passage.

In accordance with the configuration, the air present in the region defined between the outer wall surface of the main wall of the air-intake duct and the inner wall surface of the air cleaner box can be suctioned through the sub-passage. In addition, since the sub-passage is positioned in close proximity to the air cleaner element, the air flowing within the air cleaner box can be guided smoothly to the sub-passage. As a result, air-intake efficiency of guiding the air inside the air cleaner box to the throttle device can be improved.

The above and further objects and features of the invention will more fully be apparent from the following detailed description with reference to the accompanying drawings.

DETAILED DESCRIPTION OF THE INVENTION

Hereinafter, embodiments of the present invention will be described with reference to the drawings. As used hereinafter, the direction is referenced from a driver mounting a motorcycle. In the Figures, an arrow F depicted suitably indicates "forward."

Embodiment 1

Figure 1:
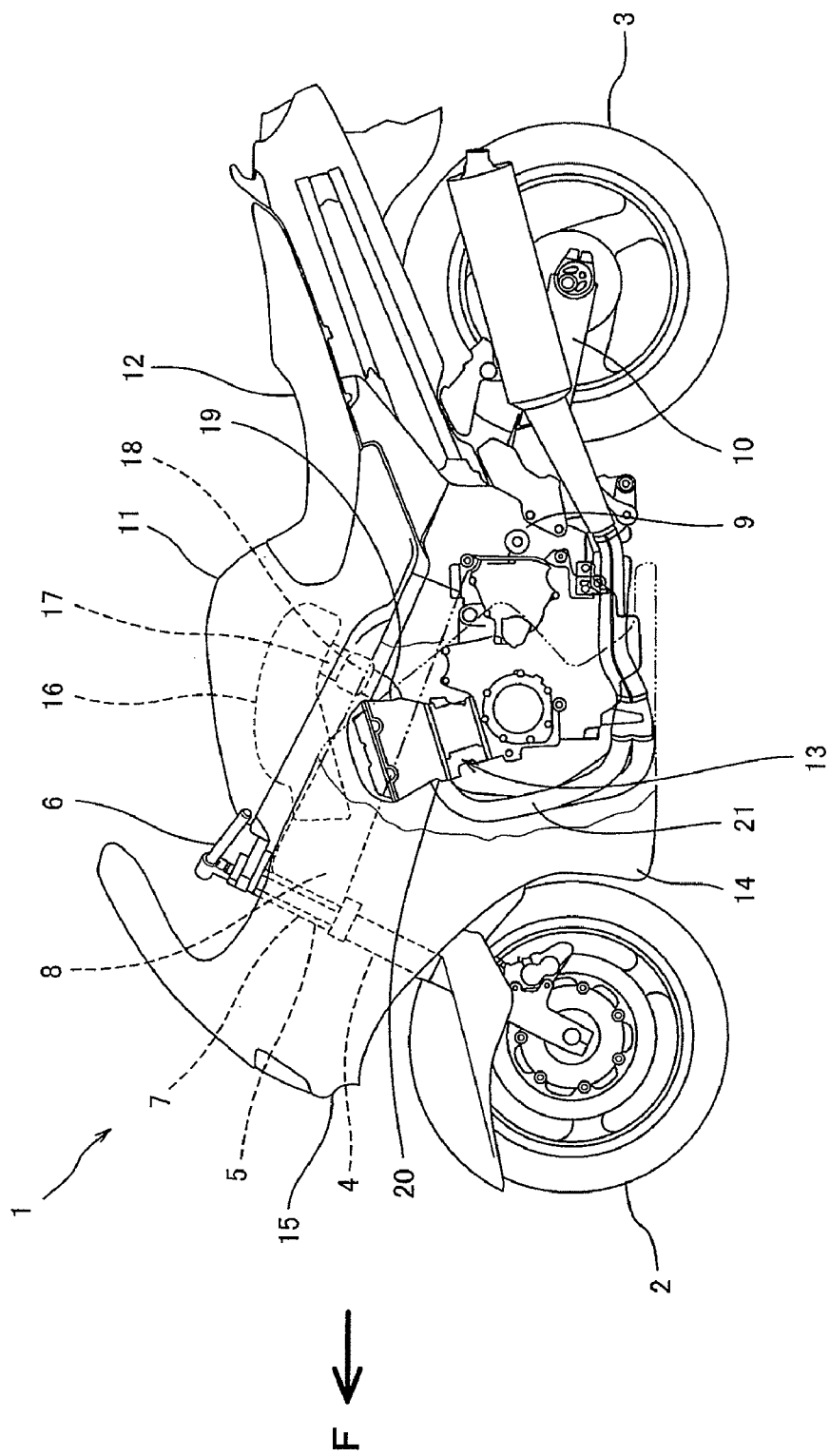
FIG. 1 is a left side view of a motorcycle according to Embodiment 1 of the present invention.

FIG. 1 is a left side view of a motorcycle 1 according to Embodiment 1 of the present invention. As shown in FIG. 1, the motorcycle 1 includes a front wheel 2 and a rear wheel 3. The front wheel 2 is rotatably mounted to the lower portion of a front fork 4 extending substantially vertically. A bar-type steering handle 6 extending rightward and leftward is mounted to the upper portion of the front fork 4 via a steering shaft 5. The steering shaft 5 is rotatably supported by a head pipe 7 forming a part of a frame. A pair of right and left main frame members 8 extends rearward from the head pipe 7. Pivot frame members 9 respectively extend downward from the rear portions of the main frame members 8. A swing arm 10 is pivotally mounted at the front end portion thereof to each of the pivot frames 9. The rear wheel 3 is rotatably mounted to the rear end portions of the swing arms 10.

A fuel tank 11 is provided above the main frame members 8. A seat 12 which is straddled by the driver is provided behind the fuel tank 11. An engine 13 is mounted below the main frame members 8 and a cowling 14 covers the both sides of the engine 13.

The engine 13 is an inline four-cycle four-cylinder reciprocating engine. In a state where the engine 13 is mounted in the motorcycle 1, four cylinders are arranged in a rightward and leftward direction and the axis of a crankshaft (not shown) extends in the rightward and leftward direction. It should be noted that the number of cylinders of the engine 13, the layout of the cylinders and the orientation of the crankshaft are not limited to these but can be changed suitably. The driving power of the engine 13 is transmitted to the rear wheel 3 via a chain (not shown).

The downstream end portion of the throttle device 18 is coupled to an intake port 19 of the engine 13. The air cleaner box 16 is coupled to the upstream end portion of the throttle device 18 via the air-intake duct 17. The air cleaner box 16 is disposed below the fuel tank 11 and above the engine 13. The air cleaner box 16 opens forward and is configured to take in air flowing into the air cleaner box 16 through a front portion opening 15 of the cowling 14. An exhaust pipe 21 is coupled to an exhaust port 20 of the engine 13.

Figure 2:
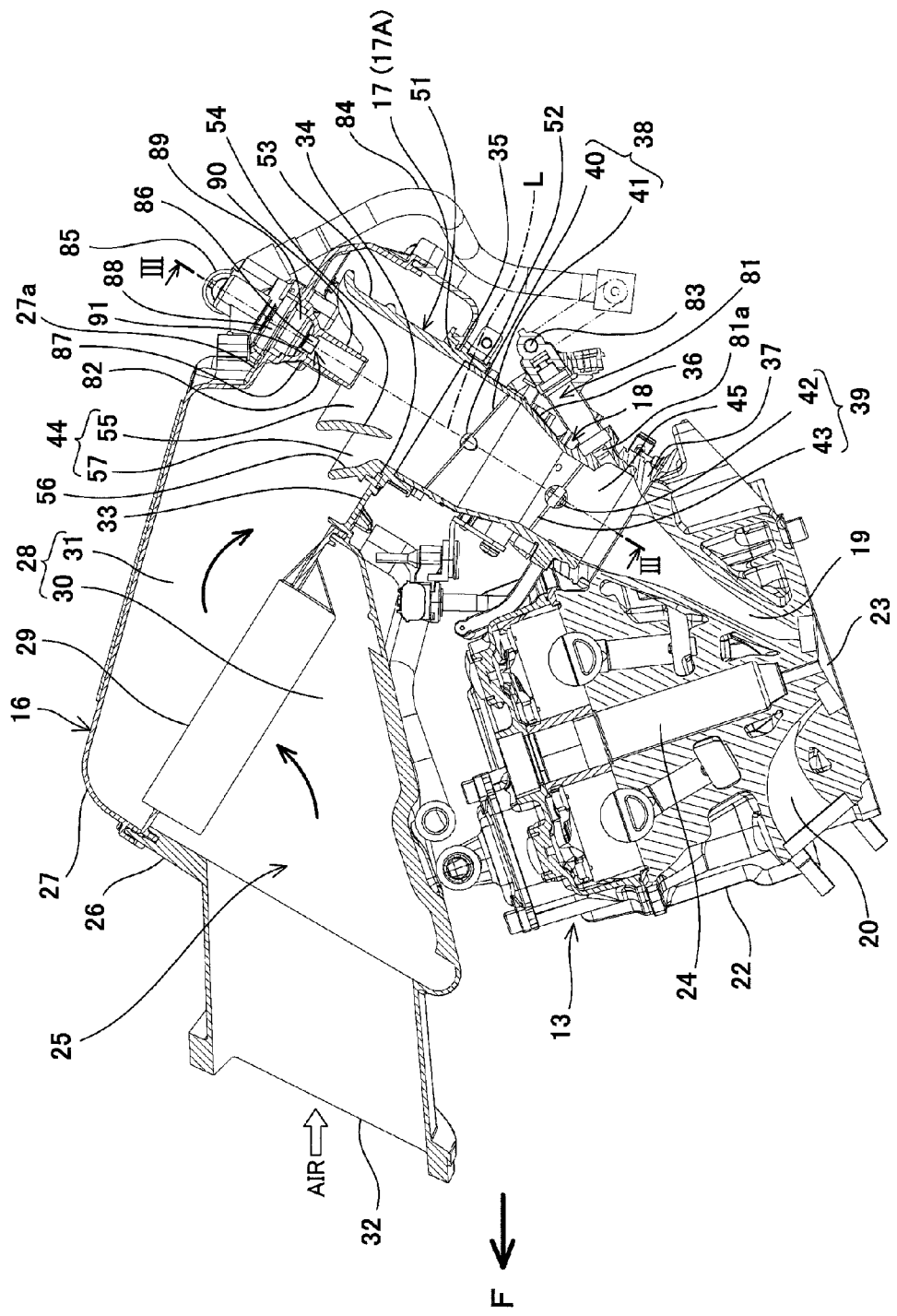
FIG. 2 is a cross-sectional view showing an engine of the motorcycle of FIG. 1 and an air-intake structure including an air-intake duct, as viewed from the side.

FIG. 2 is a cross-sectional view showing the engine 13 of the motorcycle 1 of FIG. 1 and the air-intake structure, as viewed from the side. Although FIG. 2 shows the transverse cross-section of only one cylinder, the transverse cross-sections of the remaining cylinders and the associated air-intake passages have substantially the same shape as those shown in FIG. 2. As shown in FIG. 2, the engine 13 includes a cylinder head 22. The cylinder head 22 has a combustion chamber 23 separately provided in each piston (not shown) and a plug hole 24 for accommodating a plug (not shown) for igniting an air-fuel mixture supplied to the combustion chamber 23. To the combustion chamber 23, the exhaust port 20 extending forward and the intake port 19 extending rearward are connected. The air-fuel mixture is supplied to the combustion chamber 23 through the intake port 19. The exhaust pipe 21 (see FIG. 1) is coupled to the front portion of the cylinder head 22 and a combustion gas is exhausted outside through the inside of the exhaust port 20 and the exhaust pipe 21. Valves (not shown) are provided in the cylinder head 22 to open and close the ports 19 and 20, respectively at suitable timings. By the operation of the valves, intake, compression, expansion and exhaust are performed in this order according to the reciprocating operation of the piston.

As shown in FIG. 2, the air-intake structure of the motorcycle 1 is formed such that the air cleaner box 16, the air-intake duct 17, the throttle device 18, and the intake port 19 of the engine 13 are coupled in this order from the upstream side in an air flow direction. The inner spaces of these members are connected to each other to form an air-intake passage 25 leading to the combustion chamber 23 of the engine 13. In this embodiment, as a fuel feeding method, a so-called double injector method is employed. Two injectors 81 and 82 are configured to inject a fuel to two regions within the air-intake passage 25.

The air cleaner box 16 includes a lower case 26 and an upper case 27 which are made of synthetic resin and are coupled to each other such that they are arranged in the vertical direction. In an inner space 28 of the air cleaner box 16, an air cleaner element 29 including a filter is accommodated. The inner space 28 of the air cleaner box 16 is separated into a dirty side 30 at the upstream side and a clean side 31 at the downstream side by the air cleaner element 29. An inlet opening 32 through which air from outside is introduced is provided at the front portion of the lower case 26 which faces the dirty side 30. An outlet opening 34 is provided at the rear portion of a bottom wall portion 33 of the lower case 26 which faces the clean side 31. Each air-intake duct 17 is internally fitted into and coupled to the outlet opening 34. The outlet opening 34 has an inner peripheral edge portion which is L-shaped in cross-section.

The air-intake duct 17 is integrally formed using a flexible elastic material such as rubber or a plastic material such as synthetic resin. The air-intake duct 17 has an annular engagement groove 35 on the outer peripheral surface thereof. The inner peripheral edge portion having a L-shaped cross-section of the outlet opening 34 of the air cleaner box 16 is fitted into the engagement groove 35 in a substantially close-contact state. The portion of the air-intake duct 17 which is downstream relative to the engagement groove 35 is located outside (underside herein) of the air cleaner box 16, while the portion of the air-intake duct 17 which is upstream relative to the engagement groove 35 penetrates through the bottom wall portion 33 of the air cleaner box 16, protrudes into the clean side 31 of the inner space 28, and its end portion opens at the front upper portion of the clean side 31. In a case where the air-intake duct 17 is formed of an elastic material such as rubber, the air-intake duct 17 can be easily attached to the air cleaner box 16 with the above arrangement.

The downstream end portion of the air-intake duct 17 is fitted to the upstream end portion of a body 36 of the throttle device 18. The downstream end portion of the body 36 of the throttle device 18 is coupled to the cylinder head 22 from behind via a holder 37. An air-intake passage 45 inside the body 36 of the throttle device 18 is funnel-shaped. An upstream throttle valve 38 is built into an upstream large-diameter portion of the air-intake passage 45, while a downstream throttle valve 39 is built into a downstream small-diameter portion of the air-intake passage 45. The upstream throttle valve 38 includes a rotatable valve shaft 40 extending in the rightward and leftward direction along a center axis of the air-intake passage 45, and a valve body 41 which is fixed to the valve shaft 40 and is disposed within the air-intake passage 45. The downstream throttle valve 39 has the valve shaft 42 and the valve body 43 having a similar structure. The valve shaft 40 of the upstream throttle valve 38 is driven by a motor (not shown) which is electrically controlled according to a rotation operation amount of a throttle grip (not shown). The valve shaft 42 of the downstream throttle valve 39 is manually driven by a wire mechanically connected to the throttle grip (not shown). When the rotational positions (i.e., opening degrees of the throttle valves 38 and 39) of the valve bodies 41 and 43 change according to the rotation of the valve shafts 40 and 42, the passage area of the air-intake passage 45 within the body 36 changes to control the amount of air (air-fuel mixture) supplied to the combustion chamber 23, enabling the control of the driving power of the engine 13.

When the air-intake valve (not shown) operates to open the intake port 19 to supply air to each cylinder, a negative pressure is generated in the intake port 19, air flowing into the dirty side 30 through the inlet opening 32 is filtered when the air is flowing through the air cleaner element 29, and clean air is supplied to the clean side 31. The air in the clean side 31 flows into the inner passage 44 of the air-intake duct 17, flows through the air-intake passage 45 inside the body 36 of the throttle device 18 from the large-diameter side to the small-diameter side, and flows into the intake port 19. During this process, the fuel is mixed with the air. In some cases, just after opening or just before closing the intake port 19, a positive pressure is generated momentarily in the intake port 19. In these cases, a back flow phenomenon occurs, and the air within the intake port 19 flows in an opposite direction.

Figure 3:
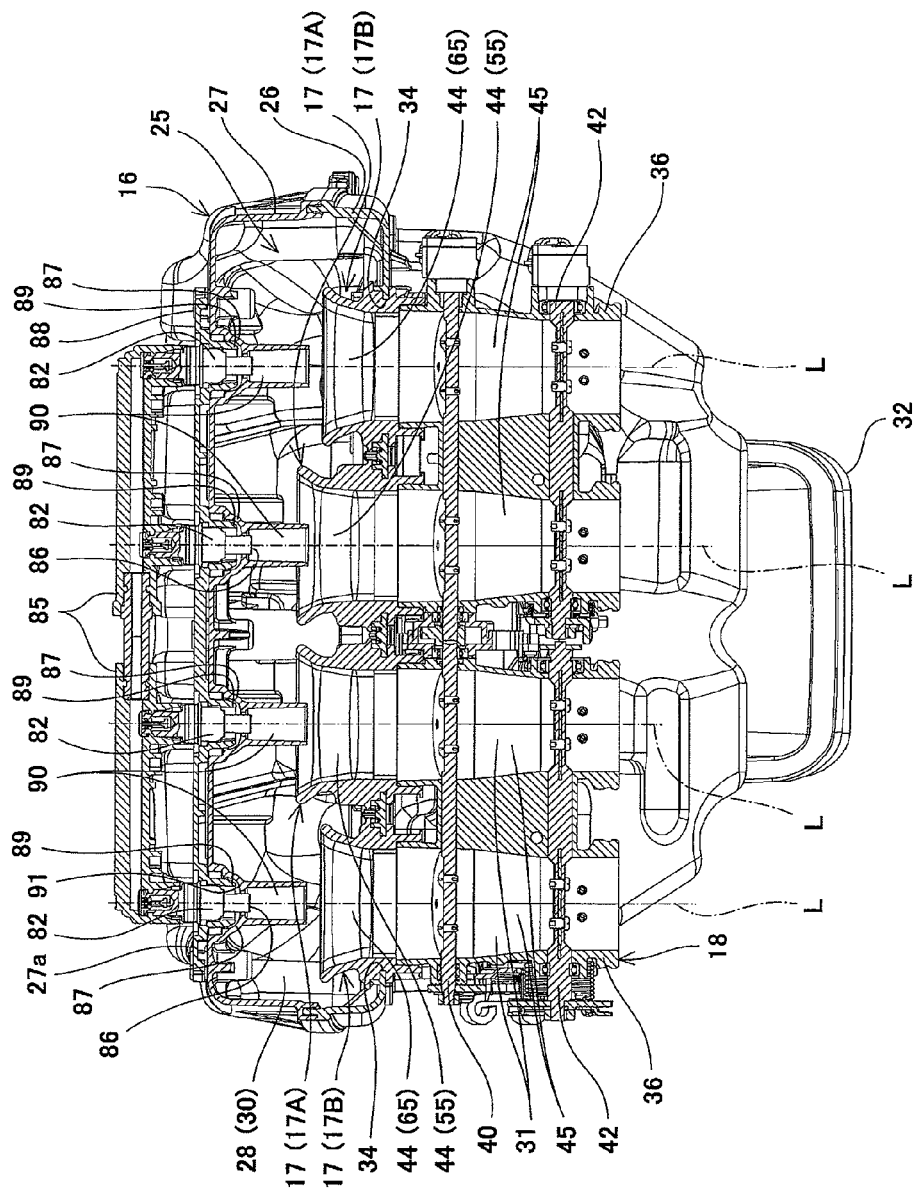
FIG. 3 is a cross-sectional view of the air-intake structure taken along line of FIG. 2.

FIG. 3 is a longitudinal sectional view of the air-intake structure taken along line of FIG. 2. In this embodiment, a case where the air-intake structure of the present invention is applied to a multi-cylinder engine will be described. As partially shown in FIG. 3, the air-intake passage 25 has a single system passage common to the four cylinders in a region from the front opening 15 (see FIG. 1) to the clean side 31 of the air cleaner box 16.

Four outlet openings 34 respectively corresponding to the cylinders are formed in the lower case 26 such that they are arranged in the rightward and leftward direction, and each air-intake duct 17 is coupled to the associated one of the outlet openings 34. The left body 36 of the two bodies 36 of the throttle device 18 has two air-intake passages 45 respectively connected to inner passages 44 of the left two air-intake ducts 17, while the right body 36 of the two bodies 36 of the throttle device 18 has two air-intake passages 45 respectively connected to inner passages 44 of the right two air-intake ducts 17.

Thus, as partially shown in FIG. 3, the air-intake passage 25 has four independent passages respectively corresponding to the cylinders in a region from the inner passages 44 of the air-intake ducts 17 to the intake ports 19 (see FIG. 2). These four passages correspond to the first cylinder, the second cylinder, the third cylinder and the fourth cylinder, respectively, from the left in FIG. 3. In the engine 13, an intake stroke, a compression stroke, an expansion stroke, and an exhaust stroke are performed in the order of, for example, the first cylinder, the third cylinder, the fourth cylinder, the second cylinder, the first cylinder, the third cylinder, . . . every time a crankshaft (not shown) rotates 180 degrees.

Figure 4:
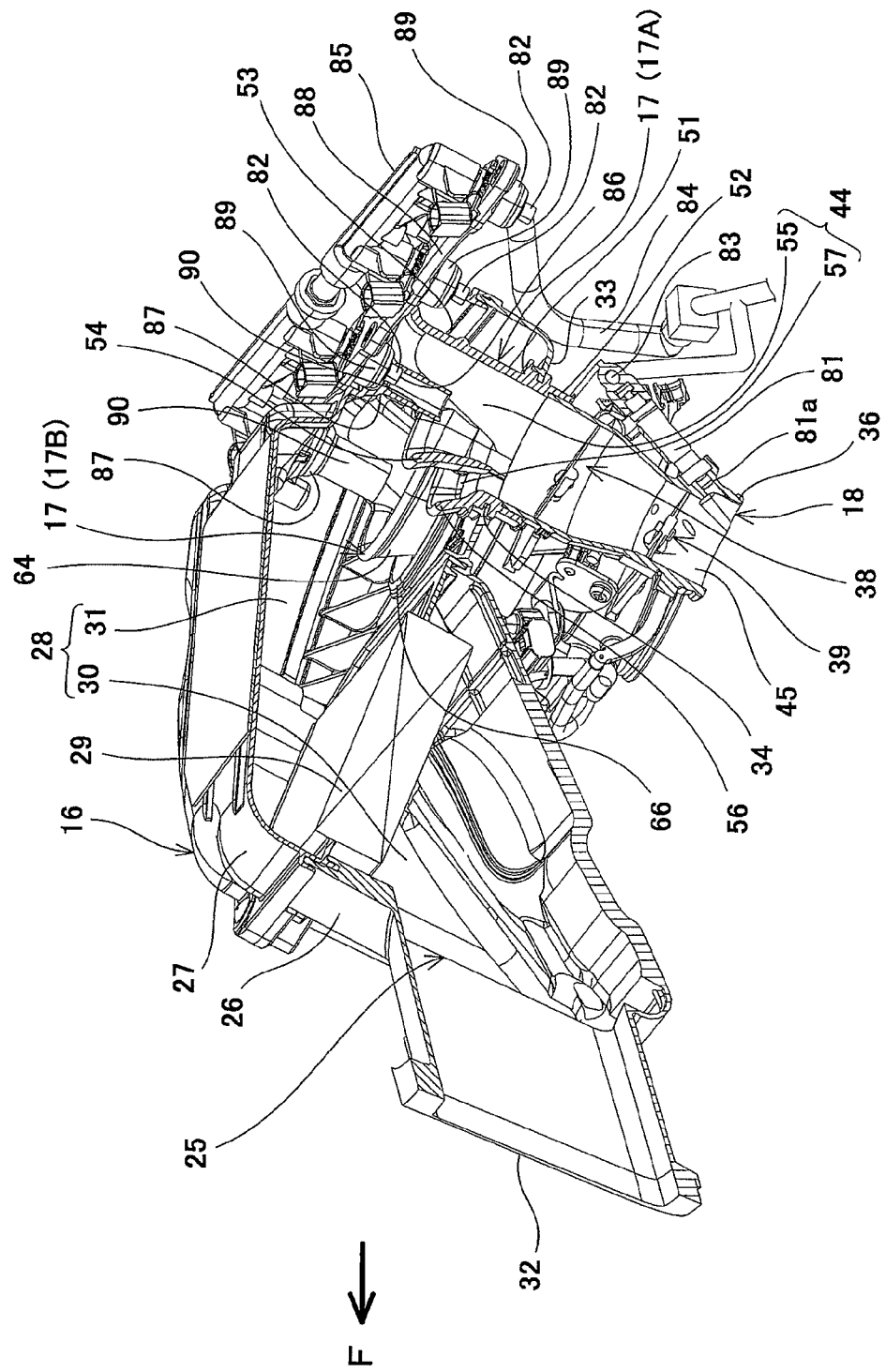
FIG. 4 is a perspective cross-sectional view of the air-intake structure of FIG. 2.

FIG. 4 is a perspective cross-sectional view of the air-intake structure of FIG. 2, showing the cross-sectional view of the air-intake duct 17 (17A) corresponding to the second cylinder and a part of the external appearance of the air-intake duct 17(17B) corresponding to the first cylinder. As shown in FIGS. 3 and 4, the air-intake ducts 17A respectively corresponding to the second and third cylinders have the same shape, while the air-intake ducts 17B respectively corresponding to the first and fourth cylinders have the same shape. The shape of the air-intake ducts 17A corresponding to the second and third cylinders is different from the shape of the air-intake ducts 17B corresponding to the first and fourth cylinders. The air-intake ducts 17A respectively corresponding to the second and third cylinders have upstream end portions longer than those of the air-intake ducts 17B respectively corresponding to the first and fourth cylinders and protrude with a larger amount into the clean side 31 within the air cleaner box 16. In FIG. 2, the air-intake duct 17A corresponding to the second and third cylinders is shown. The protruding amount is determined by setting according to specification or the like of the engine. Alternatively, the protruding amount may be adjusted automatically based on the values from sensors for detecting an engine state as described in other embodiments described later.

[Air-Intake Duct]

Figure 5:
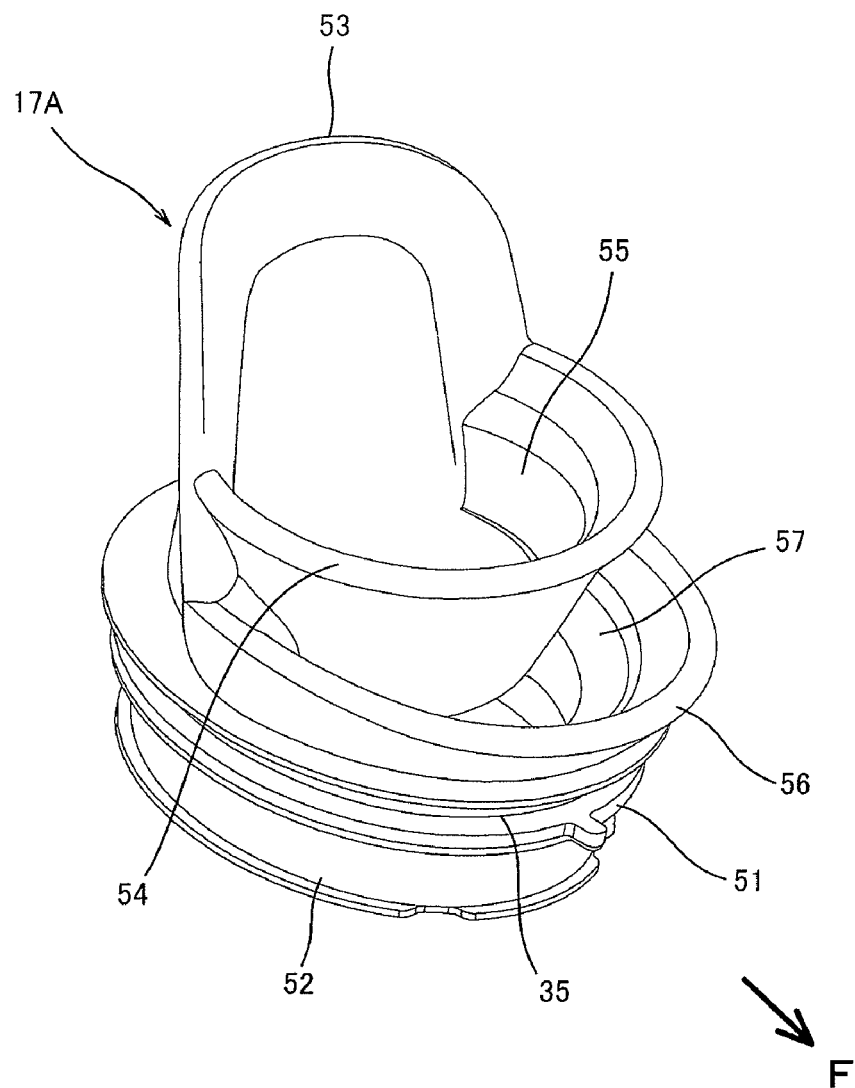
FIG. 5 is a perspective view showing the air-intake duct of FIG. 2.

FIG. 5 is a perspective view showing the air-intake duct 17A of FIG. 2. As shown in FIGS. 2 and 5, the air-intake duct 17A has a peripheral wall 51 provided with an engagement groove 35 on an outer peripheral surface thereof, and a tubular seal portion 52 is provided at the downstream end portion of the peripheral wall 51. A rear wall 53 protrudes upward from the rear portion of the peripheral wall 51. A semi-tubular main wall 54 having a smaller height than the rear wall 53 extends continuously from the front side of the rear wall 53. The inner wall surface of the main wall 54 and the inner wall surface of the rear wall 53 define a space of a main passage 55. A semi-tubular sub-wall 56 having a smaller height than the main wall 54 extends continuously from the front side (outer side) of the main wall 54. The sub-wall 56 protrudes upward from the front portion of the peripheral wall 51 having the engagement groove 35. The rear end portion of the sub-wall 56 is continuous with the lower rear end portion of the main wall 54 and the lower end portions of the rear wall 53. The inner wall surface of the sub-wall 56 and the outer wall surface of the main wall 54 define a space of a sub-passage 57. The sub-passage 57 is disposed at one side, i.e., forward in the direction substantially perpendicular to a passage axis L (see FIG. 2) of the main passage 55.

As shown in FIG. 2, the main wall 54 and the sub-wall 56 protrude toward the inner space 28 of the air cleaner box 16. The protruding amount of the sub-wall 56 into the inner space 28 is smaller than the protruding amount of the main wall 54 into the inner space 28. The sub-passage 57 is disposed in a location closer to the air cleaner element 29 than the main passage 55 and therefore, at an upstream side in an air flow direction within the air cleaner box 16. The upstream opening of the sub-passage 57 is positioned closer to the bottom wall portion 33 of the air cleaner box 16 than the upstream opening of the main passage 55. Each of the upstream end portions of the main wall 54 and the sub-wall 56 has a diameter increasing in a funnel-shape.

The main wall 54 protrudes to a location where the main wall 54 laps the tip end of a fuel guide member 90 which will be described in detail later, as viewed from the side. That is, the upper end of the main wall 54 is positioned upstream relative to the tip end of the fuel guide member 90 in the air flow direction.

Figure 6:
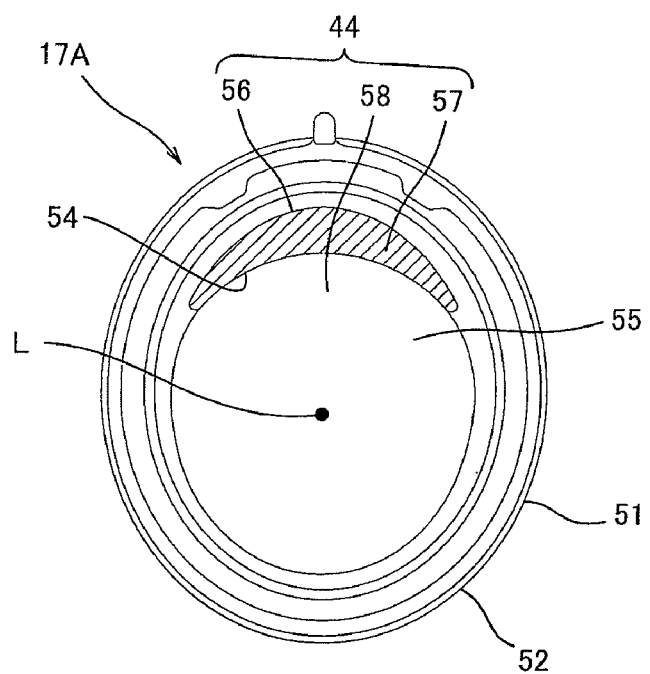
FIG. 6 is a view showing the air-intake duct of FIG. 5 as viewed from the side of a throttle device.

FIG. 6 is a view showing the air-intake duct 17A of FIG. 5 as viewed from the side of the throttle device 18. As shown in FIGS. 2 and 6, the passage cross-sectional area of the sub-passage 57 is smaller than the passage cross-sectional area of the main passage 55 (in FIG. 6, the sub-passage 57 is hatched). The sub-passage 57 is joined to the main passage 55 at a downstream side thereof. A joint passage 58 which is formed by joining the main passage 55 to the sub-passage 57 is an inner space of the peripheral wall 51. The passage cross-sectional area of the joint passage 58 is larger than the passage cross-sectional area of a boundary region formed between the main passage 55 and the joint passage 58. The sub-passage 57 is provided in a location where the sub-passage 57 overlaps with the joint passage 58 as viewed from a passage axis L of the joint passage 58 (substantially identical to the passage axis of the main passage). This enables air to flow smoothly from the sub-passage 57 to the joint passage 58, so that the air is easily guided from inside the air cleaner box 16 to the sub-passage 57.

As shown in FIG. 6, the passage cross-section of the sub-passage 57 has a substantially crescent shape conforming to the shape of the outer wall surface of the main wall 54 of a substantially circular-arc shape. This makes it possible to guide air smoothly to the sub-passage 57 along the outer wall surface of the main wall 54. The passage cross-section of the joint passage 58 has a substantially-oval shape. The sub-passage 57 is provided to include a part of a long axis of the substantially oval shape as viewed from the direction of the passage axis L of the joint passage 58. The cross-sectional shape of the main passage 55 which is formed by excluding the cross-sectional shape of the sub-passage from the cross-sectional shape of the joint passage 58 has a substantially perfect circle shape to enable air to flow stably in the main passage 55. The passage cross-section of the air-intake passage 45 (see FIGS. 2 to 4) of the throttle device 18 has a substantially oval shape which is substantially identical to that of the joint passage 58.

Figure 7:
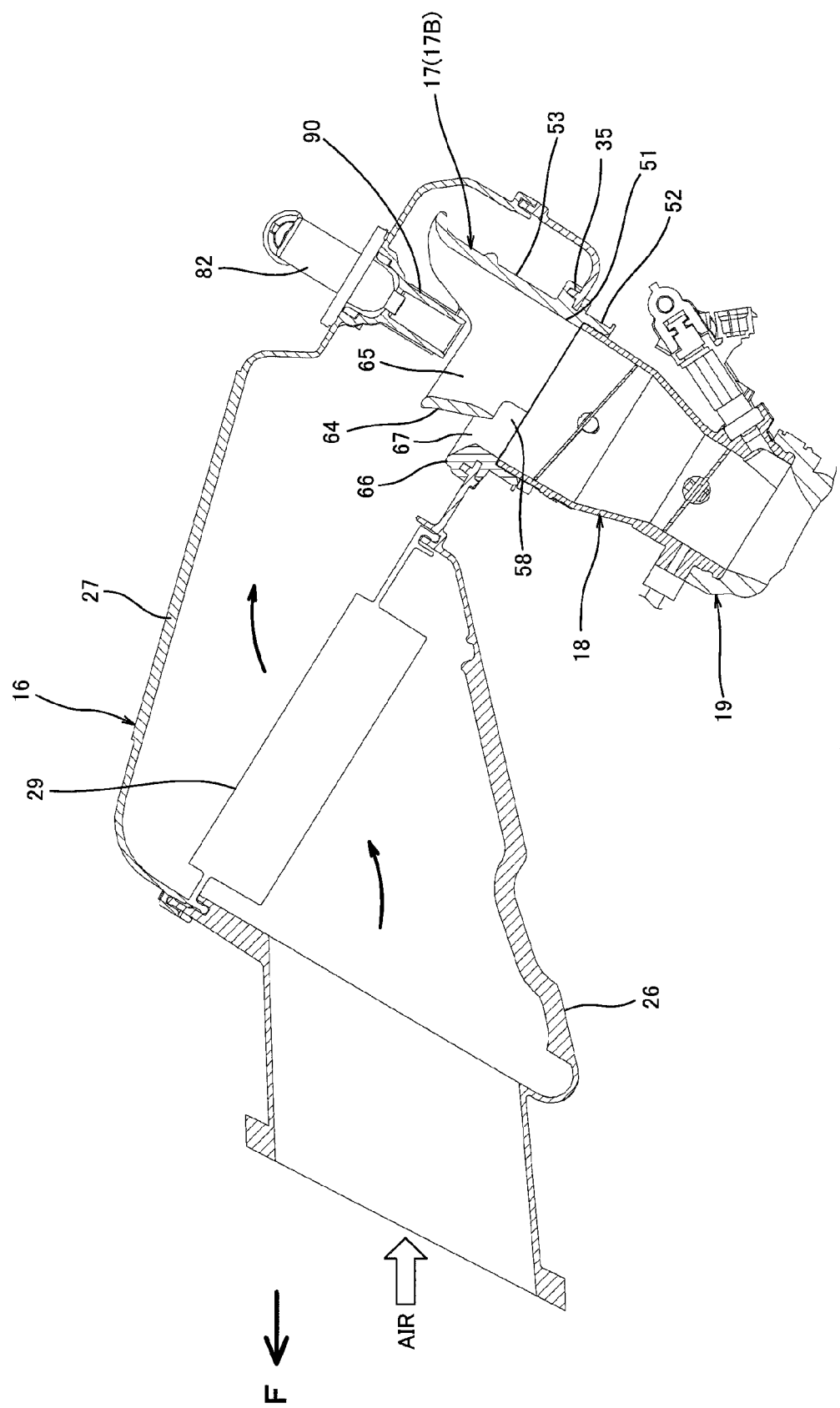
FIG. 7 is a view showing an air-intake structure including another air-intake duct, corresponding to FIG. 2.
Figure 8:
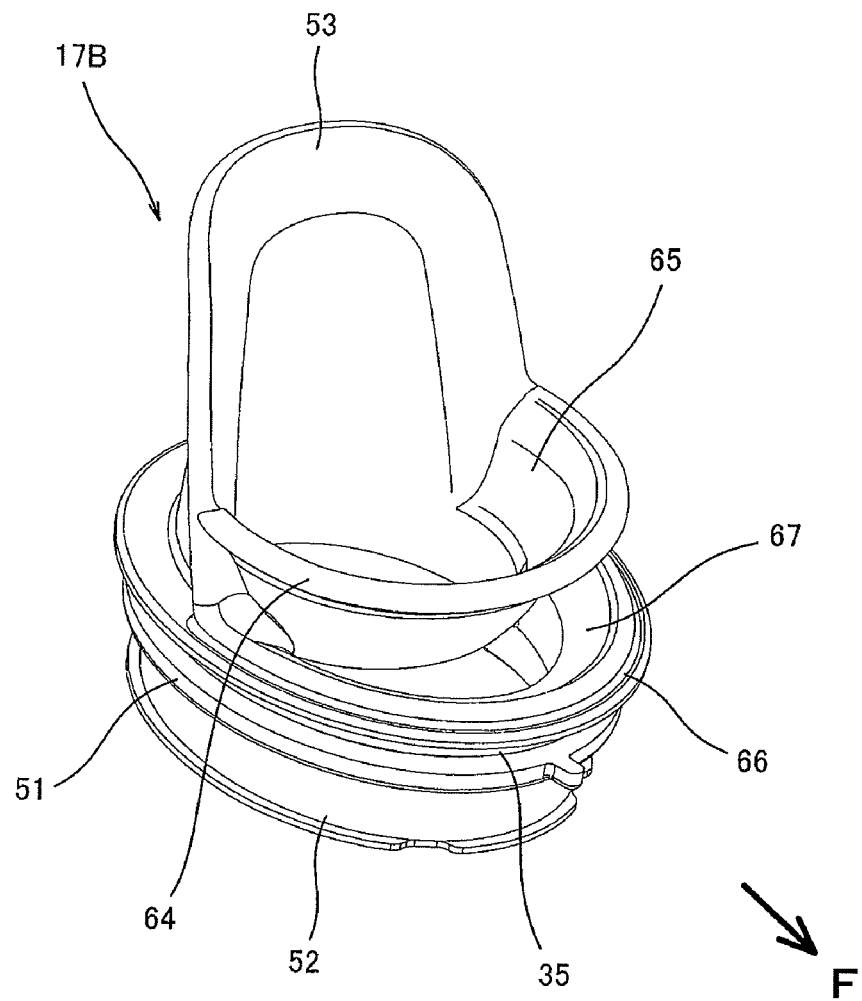
FIG. 8 is a perspective view showing the air-intake duct of FIG. 7.

FIG. 7 is a view showing an air-intake structure including the air-intake duct 17B corresponding to the first and fourth cylinders, corresponding to FIG. 2. FIG. 8 is a perspective view showing the air-intake duct 17B of FIG. 7. In FIGS. 7 and 8, the same components as those of FIGS. 2 and 5 are identified by the same reference numerals and will not be described in detail.

As shown in FIGS. 7 and 8, a main wall 64 and a sub-wall 66 of the air-intake duct 17B corresponding to the first and fourth cylinders are smaller in height than the main wall 54 and the sub-wall 56 of the air-intake duct 17A corresponding to the second and third cylinders. The semi-tubular main wall 64 having a smaller height than the rear wall 53 extends continuously from the front side of the rear wall 53. Since the main wall 64 is smaller in height than the main wall 54 of the air-intake duct 17A of FIG. 2, it does not lap the tip end of the fuel guide member 90 as viewed from the side. That is, the upper end of the main wall 64 is located downstream relative to the tip end of the fuel guide member 90 in the air flow direction. A space formed by the inner wall surface of the main wall 64 and the inner wall surface of the rear wall 53 is a main passage 65.

The semi-tubular sub wall 66 having a smaller height than the main wall 64 is provided at the front side of the main wall 64. The sub-wall 66 protrudes upward from the front portion of the peripheral wall 51. The rear end portion of the sub-wall 66 is continuous with the lower rear end portion of the main wall 64 and the lower end portions of the rear wall 53. A space formed by the inner wall surface of the sub-wall 66 and the outer wall surface of the main wall 64 is a sub-passage 67. The other structure of the air-intake duct 17B is similar to that of the air-intake duct 17A and will not be described in detail.

In accordance with the above described configuration, since the sub-walls 56 and 66 are provided outside the main walls 54 and 64 forming the main passages 55 and 65, respectively, to form the sub-passages 57 and 67, respectively such that the sub-walls 56 and 66 protrude with a smaller protruding amount than the main walls 54 and 64, air present in the region defined between the main walls 54 and 64 of the air-intake ducts 17A and 17B and the bottom wall portion 33 of the air cleaner box 16 can be suctioned through the sub-passages 57 and 67 with a larger amount. In addition, since the sub-passages 57 and 67 are located in close proximity to the air cleaner element 29, air flowing within the air cleaner box 16 is guided smoothly to the sub-passages 57 and 67. That is, air present in the vicinity of the front side of the peripheral wall 51, of the air in the clean side 31 within the air cleaner box 16, is not stagnant and flows into the sub-passages 57 and 67. In addition, since the sub-passages 57 and 67 are not located at the entire peripheries outside the main passages 55 and 65 but are located forward relative to the main passages 55 and 65, respectively, the passage cross-sectional area of the air-intake passage can be increased without increasing the lateral width of the air-intake ducts 17A and 17B as viewed from forward. As a result, air-intake efficiency of guiding the air from inside the air cleaner box 16 to the throttle device 18 can be improved without increasing the size of the air-intake ducts 17A and 17B.

Since the sub-passages 57 and 67 are joined to the main passages 55 and 65 at downstream sides thereof, respectively, the flow of the air into the sub-passages is facilitated due to a negative pressure effect of the air flowing speedily in the main passages 55 and 65 in a state where the engine 13 is in a high engine speed range. Therefore, air-intake efficiency in the high engine speed range improves, and performance in the high engine speed range improves. Since the passage cross-sectional areas of the sub-passages 57 and 67 are smaller than the passage cross-sectional areas of the main passages 55 and 65, the negative pressure effect is reduced due to a decrease in the flow speed in the main passages 55 and 65, making it difficult for air to flow into the sub-passages 57 and 67 when the engine 13 is in a low engine speed range. In this case, intake air flows mostly through the main passages 55 and 65. Because of the rectification effect of the main passages 55 and 65 having a longer passage length, the amount of intake air guided to the engine 13 is stabilized in the low engine speed range and performance in the low engine speed range improves.

The air-intake duct 17 further includes the peripheral wall 51, the engagement groove 35 formed on the outer peripheral surface of the peripheral wall 51, the tubular seal portion 52 provided at the downstream end portion of the peripheral wall 51, and the rear wall 53 protruding from the rear portion of the peripheral wall 51 which is located distant from the air cleaner element 29 inside the air cleaner box 16. The main walls 54 and 64 have a substantially semi-tubular shape which is smaller in height than the rear wall 53 and are continuous with the front side of the rear wall 53. The main passages 55 and 65 are defined by the inner wall surface of the main walls 54 and the inner wall surface of the rear wall 53. The sub-walls 56 and 67 have a substantially semi-tubular shape which is smaller in height than the main walls 54 and 64, are continuous with the front side of the main walls 54 and 64, respectively, and protrude upward from the front portion of the peripheral wall 51. The engagement groove 35 is fitted to the periphery of the outlet opening 34 of the air cleaner box 16 in a substantially close contact state. The tubular seal portion 52 is fitted to the upstream end portion of the throttle device 18 in a substantially close contact state. Since the air-intake passage 25 from the air cleaner box 16 to the throttle device 18 is sealed by the engagement groove 35 and the tubular seal portion 52 and the sub-walls 56 and 66 are continuous with the peripheral wall 51 having the engagement groove 35, the air present in the vicinity of the engagement groove 35 flows smoothly into the sub-passages 57 and 67 and is guided to the throttle device 18 stably. In addition, since the rear wall 53 which is larger in height than the main walls 54 and 64 and the sub-walls 56 and 66 protrude from the rear portion of the peripheral wall 51, the air flowing inside the air cleaner box 16 is prevented from flowing above the air-intake duct 17 without being suctioned into the air-intake duct 17.

Since the protruding amount of the main wall 54 of the air-intake duct 17A is made different from the protruding amount of the main wall 64 of the air-intake duct 17B and the protruding amount of the sub-wall 56 of the air-intake duct 17A is made different from the protruding amount of the sub-wall 66 of the air-intake duct 17B, air-intake characteristics of the air-intake ducts 17A and 17B are compensated as a whole. To be specific, by making an engine rotation torque property different due to a difference in the shape between the plural air-intake ducts 17A and 17B in a certain engine speed range, a fluctuation in air-intake performance due to a difference in the engine speed property is suppressed. As a result, the engine rotation torque property can be stabilized in the entire engine 13.

Figure 9:
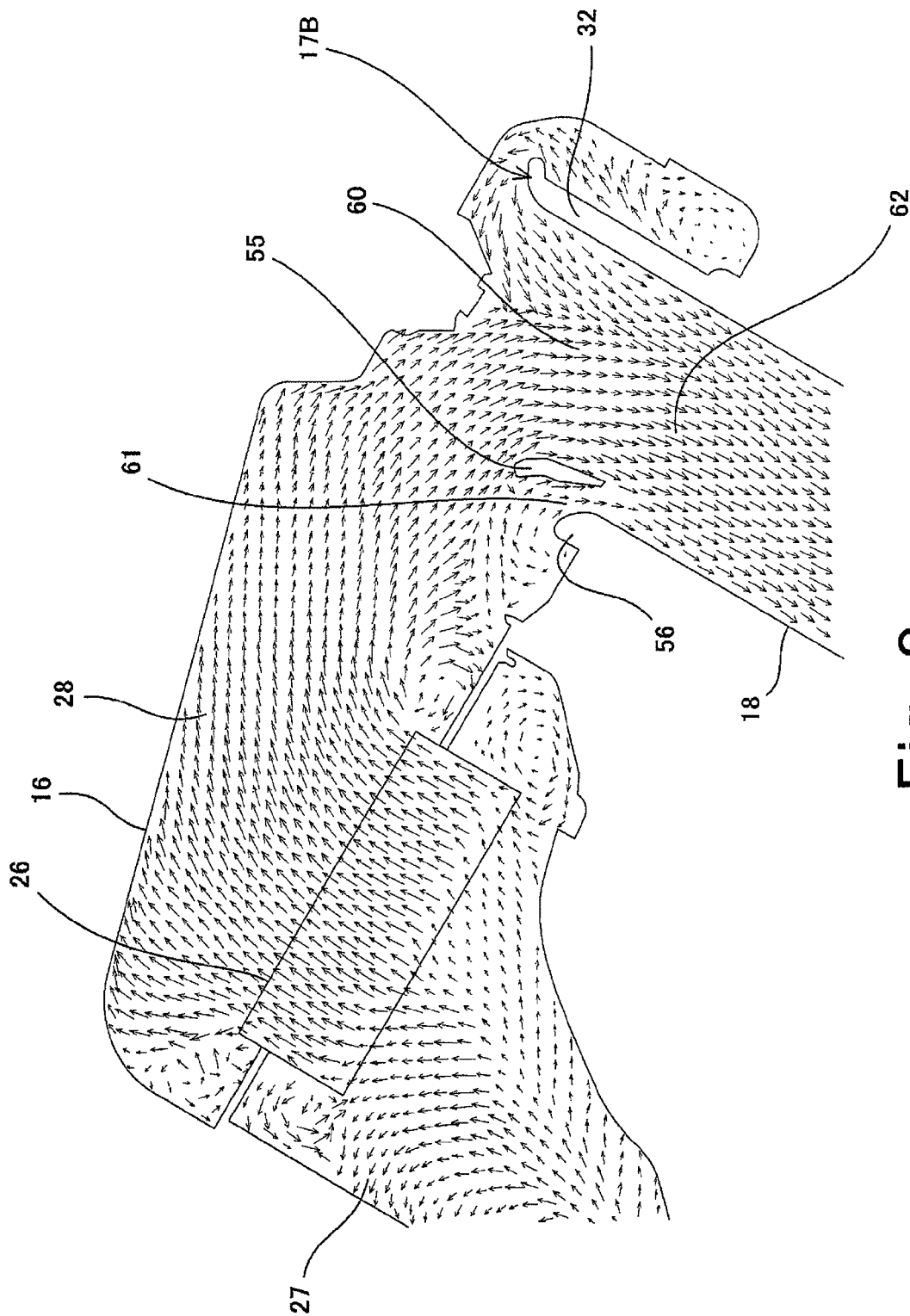
FIG. 9 is a view showing a simulation result of an air-intake state of FIG. 7.

FIG. 9 is a view showing a simulation result of an air-intake state in FIG. 7. In simulation, a general fluid analysis software program CFX (ANSYS Co., Ltd.) was used. The simulation conditions were such that an inlet pressure was an atmospheric pressure, a fluid physical value was air (20 degrees centigrade), and an outlet flow rate was constant (specified value). As can be seen from FIG. 9, in accordance with this embodiment, air flows from the clean side 31 of the air cleaner box 16 into both the main passage 65 and the sub-passage 67 of the air-intake duct 17B and is guided to the throttle device 18. Description of the simulation result of the air-intake duct A will be omitted.

Figure 10:
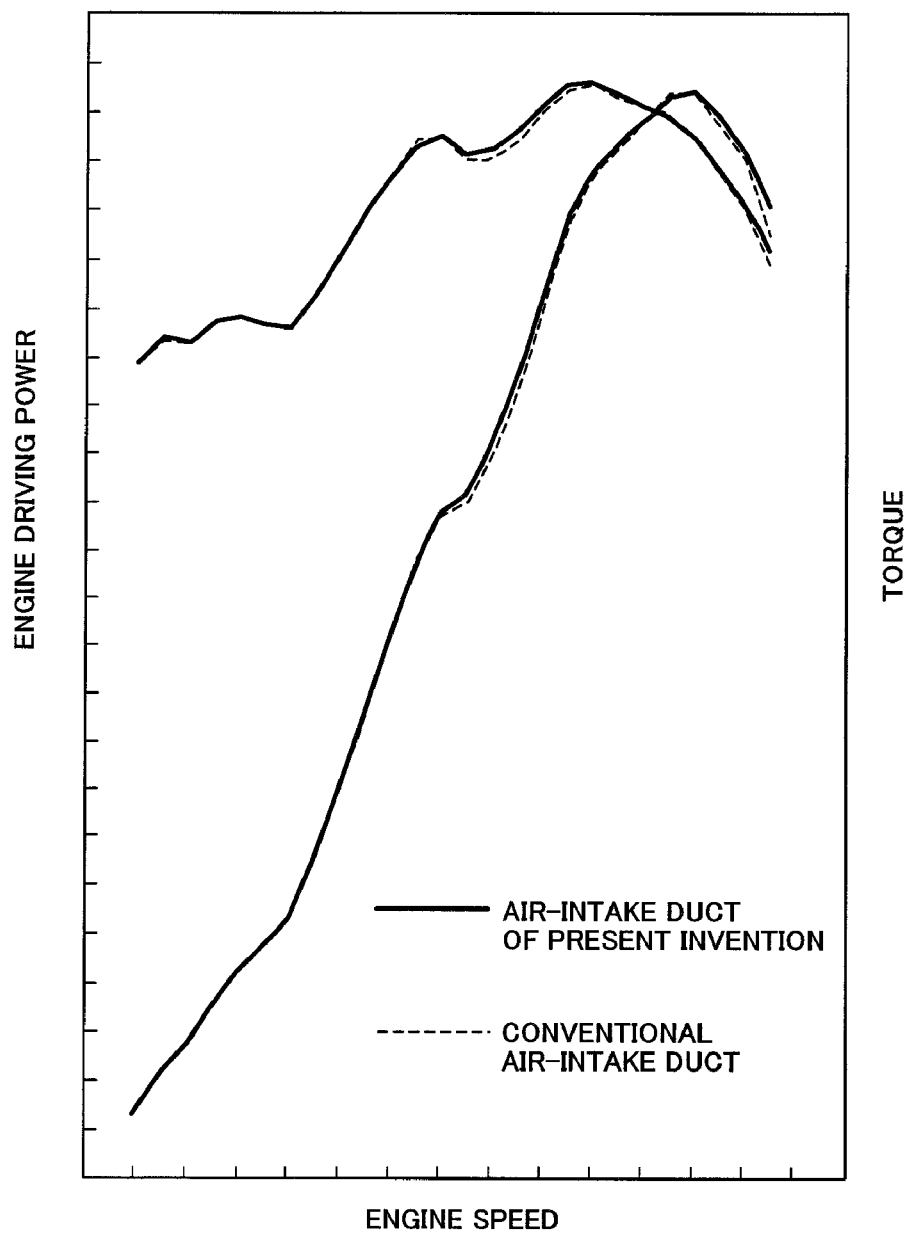
FIG. 10 is a graph showing the relationship among an engine driving power, a torque and an engine speed according to the present invention.

FIG. 10 is a graph showing the relationship between an engine driving power and a torque, and an engine speed. The engine driving power is obtained by multiplying a product of the torque and the engine speed by a predetermined coefficient. In FIG. 10, a solid line indicates results obtained by using the above-mentioned air-intake ducts 17A and 17B according to the embodiment of the present invention, and a dotted line indicates results obtained by using a conventional air-intake duct which has no sub-passage. As can be seen in FIG. 10, in accordance with the present invention, the engine driving power and the torque are improved in medium and high engine speed ranges.

[Fuel Injection Structure]

Subsequently, a fuel injection structure included in the air-intake structure having the above-mentioned configuration will be described with reference to FIGS. 2 to 4. As shown in FIG. 2, the engine 13 uses a so-called double injector system. The engine 13 includes a downstream injector 81 for injecting a fuel to a downstream portion of the air-intake passage 25, and an upstream injector 82 for injecting a fuel to an upstream portion of the air-intake passage 25. The injectors 81 and 82 are controlled by an engine control unit (not shown). For example, the downstream injector 81 primarily operates in a state where the engine 13 is in a substantially overall range from a low-load low-engine-speed state to a high-load high-engine-speed state, while the upstream injector 82 primarily operates in a state where the engine 13 is in the high-load high-engine speed state.

The downstream injector 81 is externally attached to the rear portion of the body 36 of the throttle device 18. A fuel injection portion 81a of the downstream injector 81 is positioned downstream relative to the valve body 43 of the downstream throttle valve 39 in the air-intake passage 45 inside the body 36. The downstream injector 81 is provided separately for each cylinder. Four downstream injectors 81 are arranged in the rightward and leftward direction. Each downstream injector 81 is coupled to a downstream delivery pipe 83 extending in the rightward and leftward direction at a head portion thereof. The downstream delivery pipe 83 is coupled to an upstream delivery pipe 85 via a fuel pipe 84. The downstream delivery pipe 83 is coupled to the fuel tank 11 (see FIG. 11) via a pipe (not shown). Thereby, the fuel inside the fuel tank 11 is delivered and fed to the respective upstream injectors 82 through the downstream delivery pipe 83, the fuel pipe 84 and the upstream delivery pipe 85. The downstream injectors 81 and the upstream injectors 82 respectively inject the fuel to the interior of the air-intake passage 25 at suitable timings.

As shown in FIG. 2, the upstream injector 82 is attached to the rear upper portion of the upper case 27 of the air cleaner box 16 from above, and the fuel injection portion 86 thereof is disposed in the inner space 28 of the air cleaner box 16. As shown in FIG. 3, the upstream injector 82 is provided separately for each cylinder. Four upstream injectors 82 are arranged in the rightward and leftward direction. The head portion of each upstream injector 82 is coupled to an upstream delivery pipe 85 extending in the rightward and leftward direction. Thereby, the fuel inside the fuel tank 11 (see FIG. 1) is delivered and fed to the respective upstream injectors 82 through the upstream delivery pipe 85. The upstream injectors 82 inject the fuel toward the upstream end openings of the main passages 55 of the air-intake ducts 17 through the clean side 31 at suitable timings.

As shown in FIG. 3, four injector mounting members 87 for mounting the respective upstream injectors 82 are arranged in the rightward and leftward direction on the upper wall portion 27a of the upper case 27 at locations respectively corresponding to the air-intake ducts 17. Each injector mounting member 87 has a mortar shape and includes a circular large-diameter upper opening and a circular small-diameter lower opening. A stay 88 which is formed of a metal plate is fastened to the outer upper surface of the upper wall portion 27a of the upper case 27 by bolts. Four bosses 89 are integrally provided with the stay 88 so as to protrude from a mounting surface facing the outer surface of the air cleaner box 16. The bosses 89 are accommodated into the injector mounting members 87 through the upper openings, respectively. The bosses 89 have respective through holes. The upstream injectors 82 are respectively accommodated into the through-holes of the bosses 89 one by one from above the stay 88. The upstream injector 82 has an outer shape of a stepped cylinder. In a state where the upstream injector 82 is accommodated into the through-hole, its stepped surface is in contact with the boss 89 and the upstream injector 82 is retained within the through-hole. In a state where the upstream injectors 82 are fastened to the air cleaner box 16 via the stay 88, the fuel injection portion 86 of each upstream injector 82 slightly protrudes from the lower opening of the injector mounting member 87. The center axis of each upstream injector 82 conforms to the passage axis L of the main passage 55 or 65 of the associated air-intake duct 17. The fuel injection portion 86 of each upstream injector 82 is disposed to face the center portion of the upstream end opening of the main passage 55 or 65 of the air-intake duct 17. In the air-intake structure of this embodiment, the passage axis L of the main passage 55 or 65 of the air-intake duct 17 conforms to the passage axis of the joint passage 58 of the air-intake duct 17 and the passage axis of the air-intake passage 45 of the throttle device 18 as described above.

As shown in FIG. 2, fuel guide members 90 protrude integrally from the inner surface of the upper case 27. Each fuel guide member 90 has a cylindrical shape and extends from the outer periphery of the lower opening of the injector mounting member 87 toward the outlet opening 34. Thereby, a ring-shaped rib 91 is provided at the periphery of the lower opening of the injector mounting member 87 so as to protrude radially inward from a base portion of the fuel guide member 90. The fuel injection portion 86 is surrounded by the ring-shaped rib 91 and the inner peripheral surface the base portion of the fuel guide member 90.

The fuel guide member 90 has a cylindrical inner peripheral surface with a diameter increasing slightly toward the tip end. On the other hand, the fuel guide member 90 has a wall thickness decreasing toward the tip end and has an outer diameter which is substantially constant in the axial direction thereof to avoid an increase in the size of the entire fuel guide member 90. As viewed from the axial direction, the tip end opening of the fuel guide member 90 is disposed at the inner region of outline of the upstream end opening of the air-intake duct 17. A substantially ring-shaped clearance is formed between the tip end opening of the fuel guide member 90 and the outline of the upstream end opening of the air-intake duct 17. The center axis of the fuel guide member 90 substantially conforms to the center axis of the injector mounting member 87, the center axis of the upstream injector 82 and the passage axis L of the main passages 55 and 65 of the air-intake ducts 17. It should be noted that the center axis of the fuel guide member 90 and the center axis of the injector mounting member 87 need not conform to each other. The tip end opening of the fuel guide member 90 is located in the vicinity of the upstream end opening of the main passage 55 or 65 of the air-intake duct 17 and at least downstream (in this case underside) of the rear wall 53.

Because of the above mentioned fuel guide member 90, the fuel injected from the upstream injector 82 flows through the inside of the fuel guide member 90 and is delivered from the tip end opening of the fuel guide member 90 to the intake port 19 (see FIG. 2) through the air-intake passage 25. Since the tip end opening of the fuel guide member 90 is positioned in the vicinity of the upstream end opening of the main passage 55 or 65 of the air-intake duct 17, almost all of the fuel injected through the fuel guide member 90 is introduced into the air-intake duct 17. This results in improved combustion efficiency and suppresses degradation of an engine output property and reduction of gas exhausting ability.

In a case where the fuel is injected from the upstream injector 82 in a state where the back flow of air is occurring within the air-intake passage 25, a chance that the fuel flows back in the clean side 31 is reduced and the fuel is easily guided into the main passage 55 or 65 of the air-intake duct 17 as compared to a case where the fuel is injected to the clean side 31 without providing the fuel guide member 90. This reduces a chance that the injected fuel adheres to the air cleaner element 29, making it possible to suppress degradation of performance of the air cleaner element 29.

From the test conducted by the present applicant, it is found that by providing the above-described fuel guide member 90, the fuel injected from the upstream injector 82 flows toward the tip end opening so as to draw a tornado-like trajectory within an inner space of the fuel guide member 90. By providing the fuel guide member 90, the fuel injected from the upstream injector 82 is easily atomized into a mist fuel while flowing from the tip end opening to the intake port 19 (see FIG. 2) through the air-intake passage 25, resulting in improved combustion efficiency. If the fluid communication is provided between the interior of the fuel guide member 90 and the air-intake passage 25 in a region except for the tip end opening, by forming on the outer wall of the fuel guide member 90, a slit extending axially or a through-hole of a circular shape or other shape, for example, the fuel injected from the upstream injector 82 flows through the inside of the fuel guide member 90 so as to draw a similar complex trajectory.

The air cleaner box 16 may be provided so as to communicate with an upstream side of the air-intake duct 17, and the upstream injector 82 and the fuel guide member 90 may be provided in the air cleaner box 16. In such a configuration, the fuel guide member 90 can be disposed in the inner space 28 of the air cleaner box 16. Since all of the fuel injected from the upstream injector 82 is easily guided to the air-intake duct 17, the fuel can be used efficiently.

Since the fuel guide member 90 is formed integrally when the upper case 27 of the air cleaner box 16 is molded, purpose-made components may be omitted, and the structure will not become intricate. Since the fuel guide member 90 is provided integrally with the upper case 27, it is desirable to manufacture the upper case 27 by injection molding.

With reference to FIG. 3, the fuel guide member 90 is provided separately for each upstream injector 82. This makes it possible to improve combustion efficiently in each cylinder in the engine including plural cylinders.

Although the four fuel guide members 90 have an equal axial length, the protruding height of the air-intake ducts 17B corresponding to the first and fourth cylinders is smaller than that of the air-intake ducts 17A corresponding to the second and third cylinders. With reference to FIGS. 3 and 4, the tip end openings of the fuel guide members 90 corresponding to the second and third cylinders are located downstream relative to the edges of the main walls 54 of the air-intake ducts 17A corresponding to these cylinders and the tip end portions of the fuel guide members 90 are disposed within the main passages 55 of the air-intake ducts 17A. On the other hand, the tip end openings of the fuel guide members 90 corresponding to the first and fourth cylinders are located upstream relative to the edges of the main walls 64 of the air-intake ducts 17B corresponding to these cylinders and the tip end portions of the fuel guide members 90 are disposed within the main passages 65 of the air-intake ducts 17B.

Therefore, in the second and third cylinders, passage resistance of the main passage 55 of the air-intake duct 17A increases and the engine driving power in a high engine speed range decreases, but the back flow of the fuel can be effectively suppressed. In the first and fourth cylinders, the back flow of the fuel occurs somewhat more easily than in the second and third cylinders. However, since the passage resistance of the air-intake duct 17B does not increase, a high engine driving power can be maintained in a high engine speed range. It should be noted that the back flow of the fuel can be effectively suppressed by providing the fuel guide members 90 in the first and fourth cylinders. Thus, by arranging the tip end portions of the fuel guide members 90 with respect to the upstream end openings of the main passages 55 and 65 of the air-intake ducts 17 in different positions between the cylinders, a high engine driving power is attained in the high engine speed range and the back flow of the fuel is prevented.

The protruding heights of the air-intake ducts may be made equal and the length of the fuel guide members may be made different from cylinder to cylinder so long as the relationship between the upstream end openings of the air-intake ducts 17 and the tip end openings of the fuel guide members 90 is formed as described above.

Embodiment 2

Figure 11:
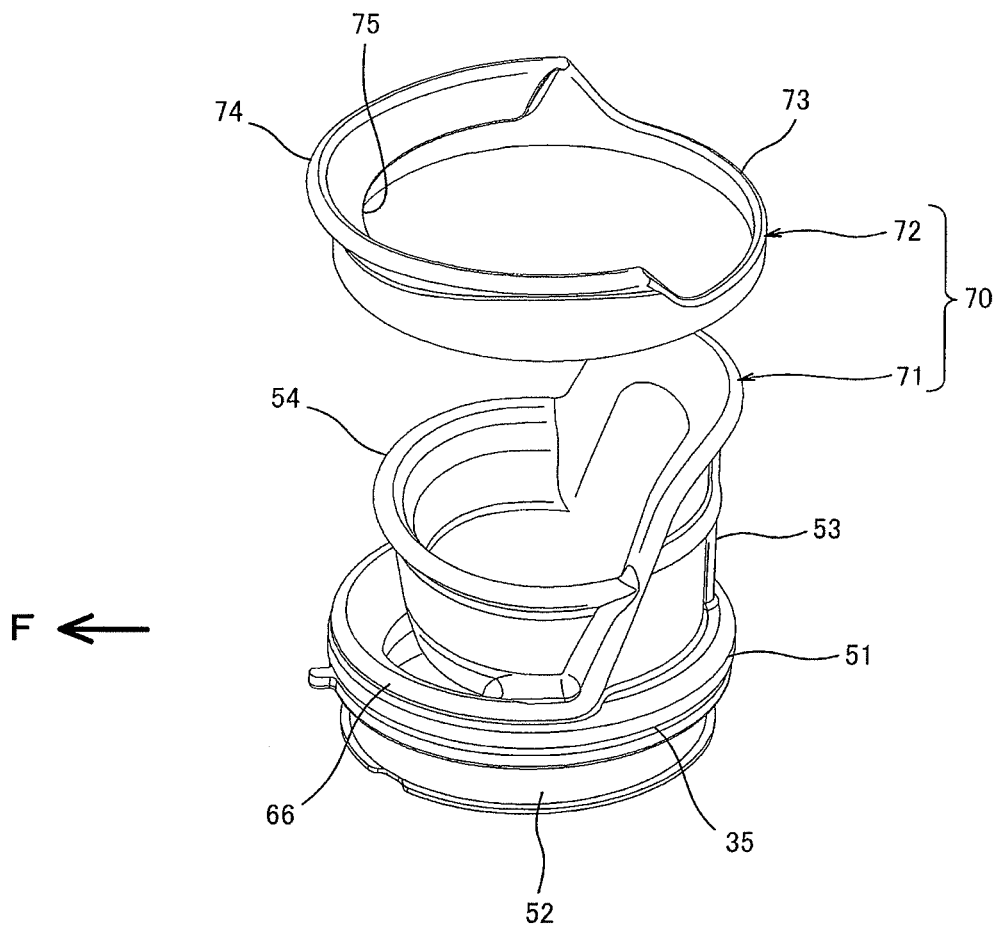
FIG. 11 is an exploded perspective view of an air-intake duct according to Embodiment 2 of the present invention.

FIG. 11 is an exploded perspective view of an air-intake duct 70 according to Embodiment 2 of the present invention. As shown in FIG. 11, the air-intake duct 70 of this embodiment includes a duct base 71 and an attachment member 72. The same components as those of the above-described air-intake ducts 17A and 17B are designated by the same reference characters and will not be described in detail.

The duct base 71 has a main wall 54 identical to that of the air-intake duct 17A and a sub-wall 66 identical to that of the air-intake duct 17B. That is, the protruding amount of the sub-wall 66 in an upward direction is much smaller than the protruding amount of the main wall 54 in an upward direction. The attachment member 72 includes a tubular ring portion 73 with a smaller height and a semi-tubular extension portion 74 protruding upward from the front half portion of the ring portion 73. The extension portion 74 has a funnel shape with a diameter increasing in an upward direction. A recess 75 is formed on the inner peripheral surface of a connecting portion where the lower end portion of the extension portion 74 is connected to the upper end portion of the ring portion 73 and placed on the upper end portion of the sub-wall 66 of the duct base 71.

Figure 12:
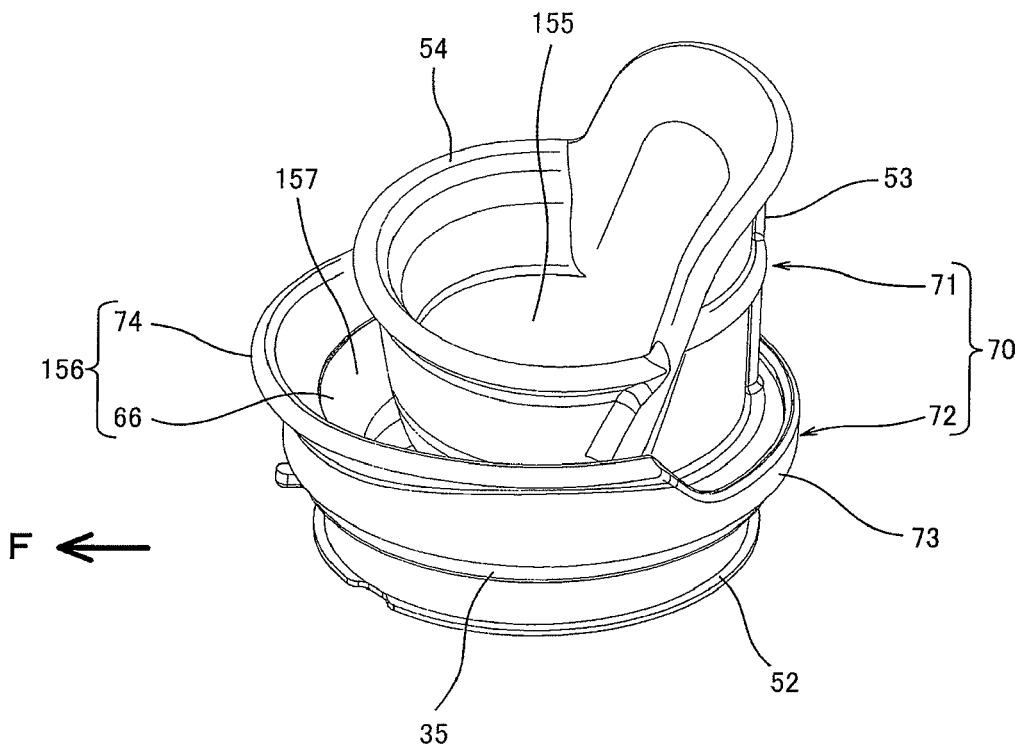
FIG. 12 is a perspective view of the air-intake duct of FIG. 11 in an assembled state.
Figure 13:
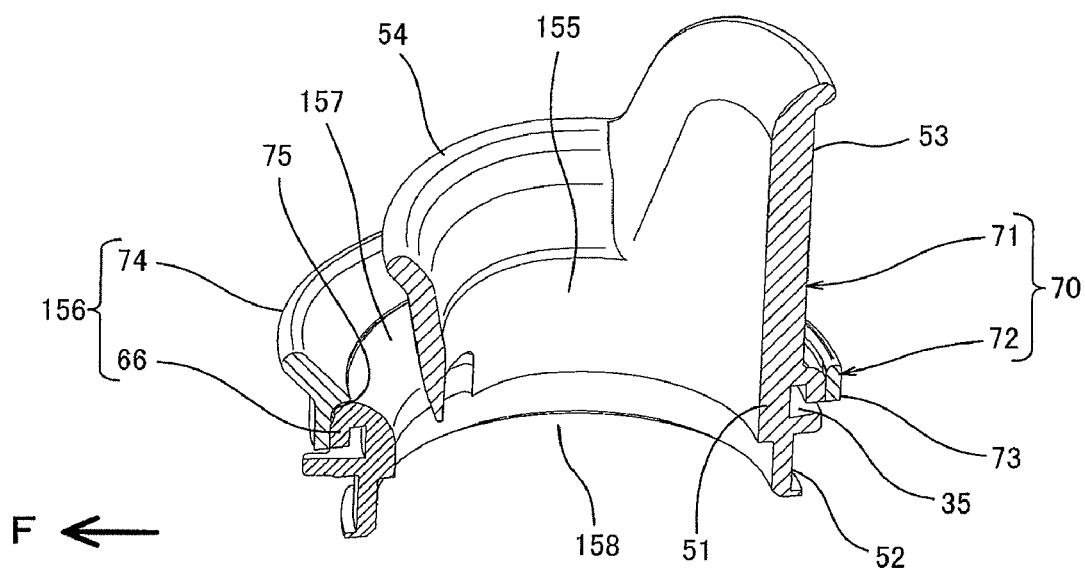
FIG. 13 is a perspective cross-sectional view of the air-intake duct of FIG. 12.

FIG. 12 is a perspective view showing an assembled state of the air-intake duct 70 of FIG. 11. FIG. 13 is a perspective cross-sectional view of the air-intake duct 70 of FIG. 12. As shown in FIGS. 11 to 13, the attachment member 72 is fitted to the duct base 71 from above. Thereby, the recess 75 of the attachment member 72 is placed on the upper end portion of the sub-wall 66 of the duct base 71, enabling the attachment member 72 to be firmly attached to the duct base 71. In this assembled state, the ring portion 73 of the attachment member 72 is externally fitted to the peripheral wall 51 of the duct base 71, and the extension portion 74 of the attachment member 72 is continuous with the upper side of the sub-wall 66 of the duct base 71. That is, the extension portion 74 of the attachment member 72 serves to substantially extend the sub-wall 66 of the duct base 71 in an upward direction, and the extension portion 74 and the sub-wall 66 form a sub-wall 156 of the air-intake duct 70 as a whole. The peripheral wall 51, the rear wall 53, the main wall 54, and the sub-wall 156 form a main passage 155, a sub-passage 157, and a joint passage 158 as in the above embodiment.

In accordance with the above configuration, by applying the attachment member 72 to the existing duct base 71, the protruding amount of the sub-wall 156 of the air-intake duct 70 in an upward direction can be easily changed. Although the sub-wall 156 is formed using the attachment member 72 as a separate member in this embodiment, the main wall may alternatively be formed by a separate member.

Embodiment 3

Figure 14:
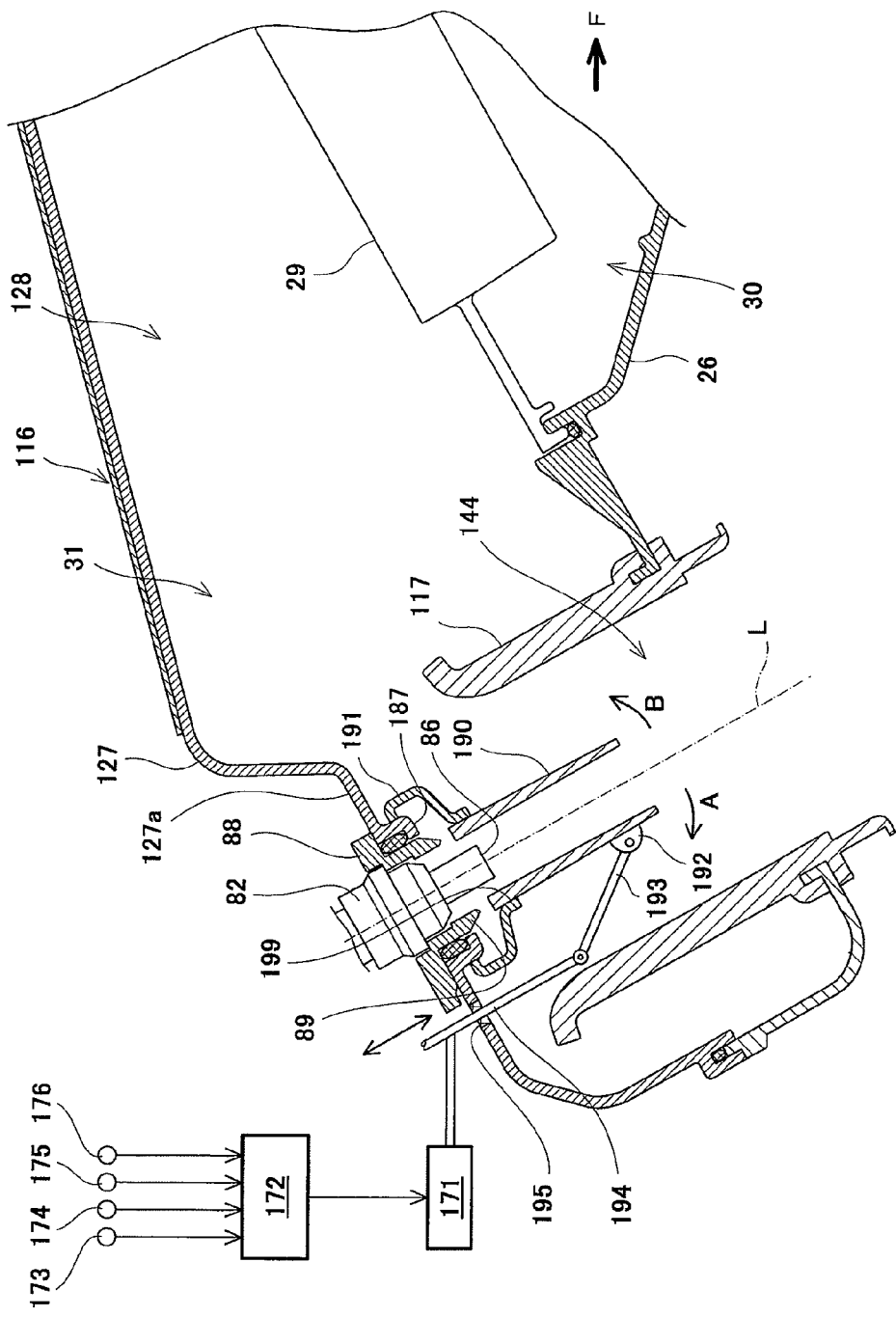
FIG. 14 is a cross-sectional view showing an air-intake structure according to Embodiment 3 of the present invention, as viewed from a right side.

FIG. 14 is a cross-sectional view showing an air-intake structure according to Embodiment 3 of the present invention, as viewed from a right side. The same components as those of the above described air-intake structure are designated by the same reference numerals and will not be described.

As shown in FIG. 14, the upstream injector 82 is retained by a boss 89 of the stay 88, and the center axis of the upstream injector 82 substantially conforms to the center axis of an inner passage 144 of an air-intake duct 117. It should be noted that the inner passage 144 of the air-intake duct 117 is not divided into a main passage and a sub-passage unlike Embodiment 1 and Embodiment 2.

A cap member 191 is fitted to an upper case 127 of an air cleaner box 116 such that the cap member 191 covers the lower opening of the injector mounting member 187. A cylindrical fuel guide member 190 is fitted to the lower end portion of the cap member 191. The cap member 191 is made of an elastic material such as rubber. The cap member 191 is securely bonded to the upper case 127 and to the fuel guide member 190. The fuel guide member 190 is bonded to the cap member 191 which is elastically deformable, at a base end portion thereof, i.e., in a region in the vicinity of the fuel injection portion 86 so as to surround the fuel injection portion 86 of the upstream injector 82. The fuel guide member 190 is fastened to the upper case 127 around this bonded portion as a pivot 199 such that the fuel guide member 190 is pivotable.

A rib 192 is provided on the outer peripheral surface of the tip end portion of the fuel guide member 190. The tip end portion of a link 193 is coupled to the rib 192 such that the link 193 is pivotable. A rod 194 is pivotally coupled to the base end portion of the link 193. The rod 194 penetrates through the upper wall 127a of the upper case 127 and is drawn to outside the air cleaner box 116. The rod 194 is extendable and retractable in one direction. A packing 195 is provided on the upper wall 127a of the upper case 127 to guide the movement of the rod 194 and to ensure air tightness of the inner space 128 of the air cleaner box 116.

A pivot operation actuator 171 is coupled to the tip end of the rod 194 to cause the rod 194 to be extended and retracted. The pivot operation actuator 171 may be a power-driven motor or other drive device such as a solenoid.

The motorcycle of this embodiment includes a controller 172 configured to control the operation of the pivot operation actuator 171. The controller 172 receives detection signals as inputs from sensors for detecting operating states of the engine, for example, a throttle valve opening degree sensor 173 for detecting an opening degree of a main throttle valve, an engine speed sensor 174 for detecting an engine speed, a vehicle speed sensor 175 for detecting a vehicle speed, a temperature sensor 176 for detecting a wall surface temperature of the engine or a cooling water temperature, etc. Based on the received detection signals, the controller 172 controls the pivot operation actuator 171. According to the operation of the pivot operation actuator 171, the rod 194 is extended and retracted. According to the direction in which the rod 194 is extended and retracted, the fuel guide member 190 coupled to the rod 194 via the link 193 is pivoted around the bonded portion where the fuel guide member 190 is bonded to the cap member 191. In FIG. 14, arrows A and B indicate an example of the direction in which the fuel guide member 190 is pivoted. The center axis of the pivoted fuel guide member 190 is tilted with respect to the center axis of the upstream injector 82 and the passage axis L of the inner passage 144 of the air-intake duct 117. Since the bonded portion where the fuel guide member 190 is bonded to the cap member 191 is located at the base end portion of the fuel guide member 190, i.e., in the region in the vicinity of the fuel injection portion 86 of the upstream injector 82, the attitude of the tip end opening of the fuel guide member 190 with respect to the upstream opening of the air-intake duct 117 changes. Although the fuel guide member 190 is pivoted so as to reciprocate to the right and to the left in the example shown in FIG. 14, it may alternatively move circularly.

Since the tip end opening of the fuel guide member 190 is changeable and the direction of the center axis of the fuel guide member 190 is changeable as described above, the injection direction of the fuel is adjusted according to the direction of the center axis of the fuel guide member 190 without changing the attitude of the tip-end side injector 82.

For example, the pivot operation actuator 171 is controlled according to the opening degree of the upstream throttle valve electronically controlled to cause the fuel guide member 190 to be pivoted so that the edge of the valve body of the upstream throttle valve is located on an extended line of the center axis of the fuel guide member 190. This causes the injected fuel to always contact the edge of the valve body, facilitating atomization and diffusion of the injected fuel. As a result, combustion efficiency is improved.

The fuel guide member 190 need not be configured to be pivoted automatically according to the operating state of the engine, but a maintenance operator may manually extend and retract the rod 194 for the purpose of tuning.

Embodiment 4

Figure 15:
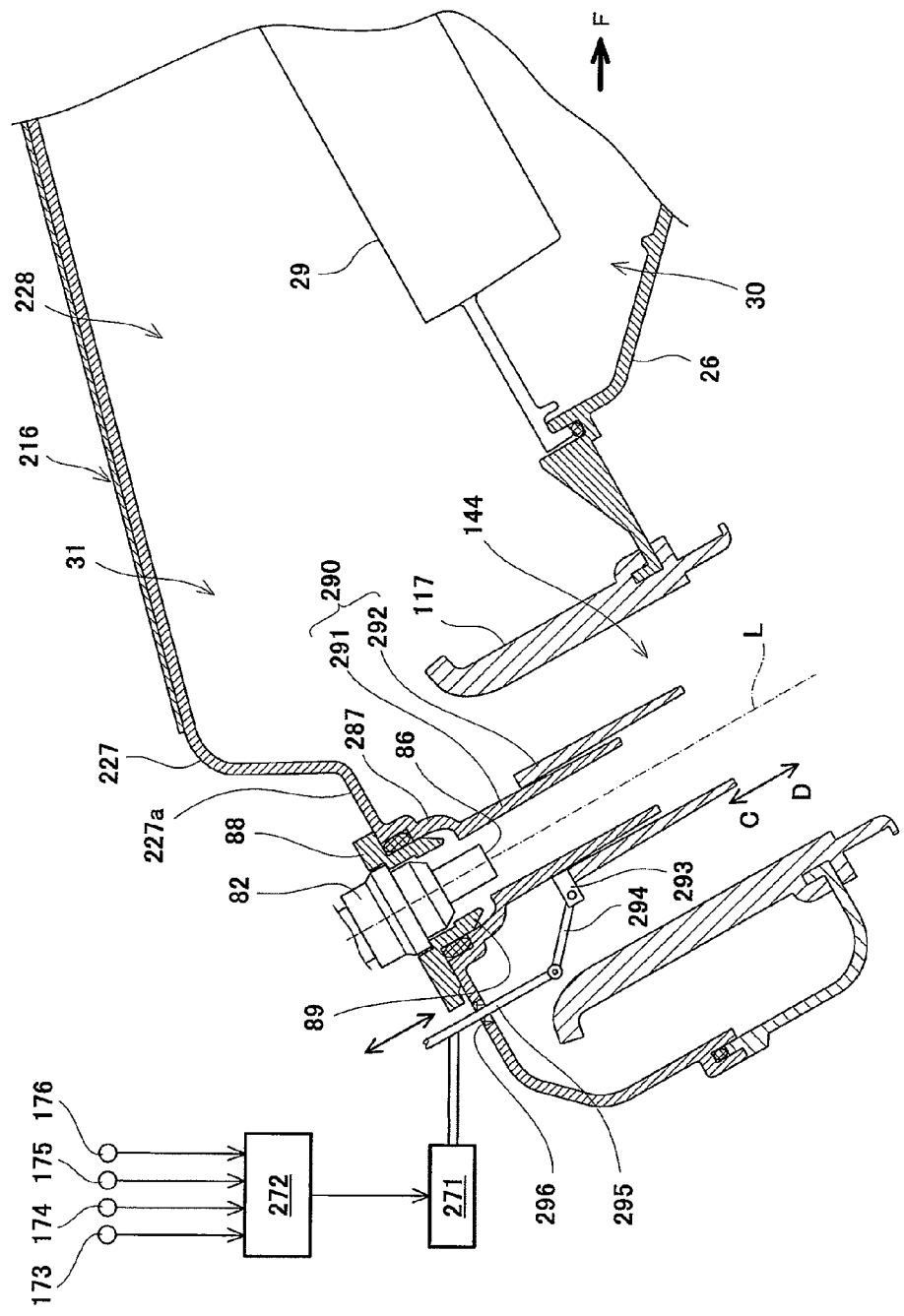
FIG. 15 is a cross-sectional view showing an air-intake structure according to Embodiment 4 of the present invention, as viewed from a right side.

FIG. 15 is cross-sectional view showing an air-intake structure according to Embodiment 4 of the present invention, as viewed from the right side. The same components as those of the above described air-intake structure are designated by the same reference numerals and will not be described.

As shown in FIG. 15, the upstream injector 82 is retained by the boss 89 of the stay 88, and the center axis of the upstream injector 82 substantially conforms to the passage axis L of the inner passage 144 of the air-intake duct 117. A first fuel guide member 291 is provided integrally with an upper case 227 of an air cleaner box 216 so as to protrude in a cylindrical shape from the outer periphery of the lower opening of the injector mounting member 287. A cylindrical second fuel guide member 292 is slidably externally fitted to the outer periphery of the first fuel guide member 291. The fuel guide member 290 of this embodiment includes the first fuel guide member 291 and the second fuel guide member 292, and is extendable and retractable in such a manner that the second fuel guide member 292 slides with respect to the first fuel guide member 291.

A rib 293 is provided on the outer peripheral surface of the base end portion of the second fuel guide member 292. The base end portion of a link 294 is coupled to the rib 293. A rod 295 is pivotally coupled to the tip end portion of the link 294. The rod 295 penetrates through an upper wall 227a of the upper case 227 and is drawn to outside the air cleaner box 216 and is extendable and retractable in one direction. A packing 296 is provided on the upper wall 227a of the upper case 227 to guide the movement of the rod 295 and to ensure air tightness of the inner space 228 of the air cleaner box 216.

An extension and retraction operation actuator 271 is coupled to the tip end of the rod 295 to cause the rod 295 to be extended and retracted. The extension and retraction operation actuator 271 may be a power-driven motor or other drive device such as a solenoid.

The motorcycle of this embodiment includes a controller 272 configured to control the operation of the extension and retraction operation actuator 271. The controller 272 receives detection signals as inputs from the sensors for detecting operating states of the engine, for example, the throttle valve opening degree sensor 173, the engine speed sensor 174, the vehicle speed sensor 175, the temperature sensor 176, etc. Based on the received detection signals, the controller 272 controls the extension and retraction operation actuator 271. According to the operation of the extension and retraction operation actuator 271, the rod 295 is extended and retracted. According to the direction in which the rod 295 is extended and retracted, the second fuel guide member 292 slides and the fuel guide member 290 is extended and retracted. In FIG. 15, arrows C and D indicate an example of the direction in which the fuel guide member 290 is extended and retracted. Thereby, the distance from the fuel injection portion 86 to the tip end opening of the fuel guide member 290 is changeable.

Since the tip end opening of the fuel guide member 290 moves and the distance from the upstream end opening of the air-intake duct 117 is changed, the passage resistance of the inner passage 144 of the air-intake duct 117 can be adjusted without changing the attitude of the tip end side injector 82. For example, when the engine is in a low-load and low-engine-speed state, the fuel guide member 290 is extended, whereas when the engine is in a high-load and high-engine-speed state, the fuel guide member 290 is retracted. This makes it possible to increase a torque in the low-load and low-engine speed state and to increase an engine driving power in the high-load and high-engine speed state.

The fuel guide member 290 need not be extended and retracted automatically according to the operating state of the engine, a maintenance operator may manually extend and retract the rod 295 for the purpose of tuning.

Embodiment 5

Figure 16:
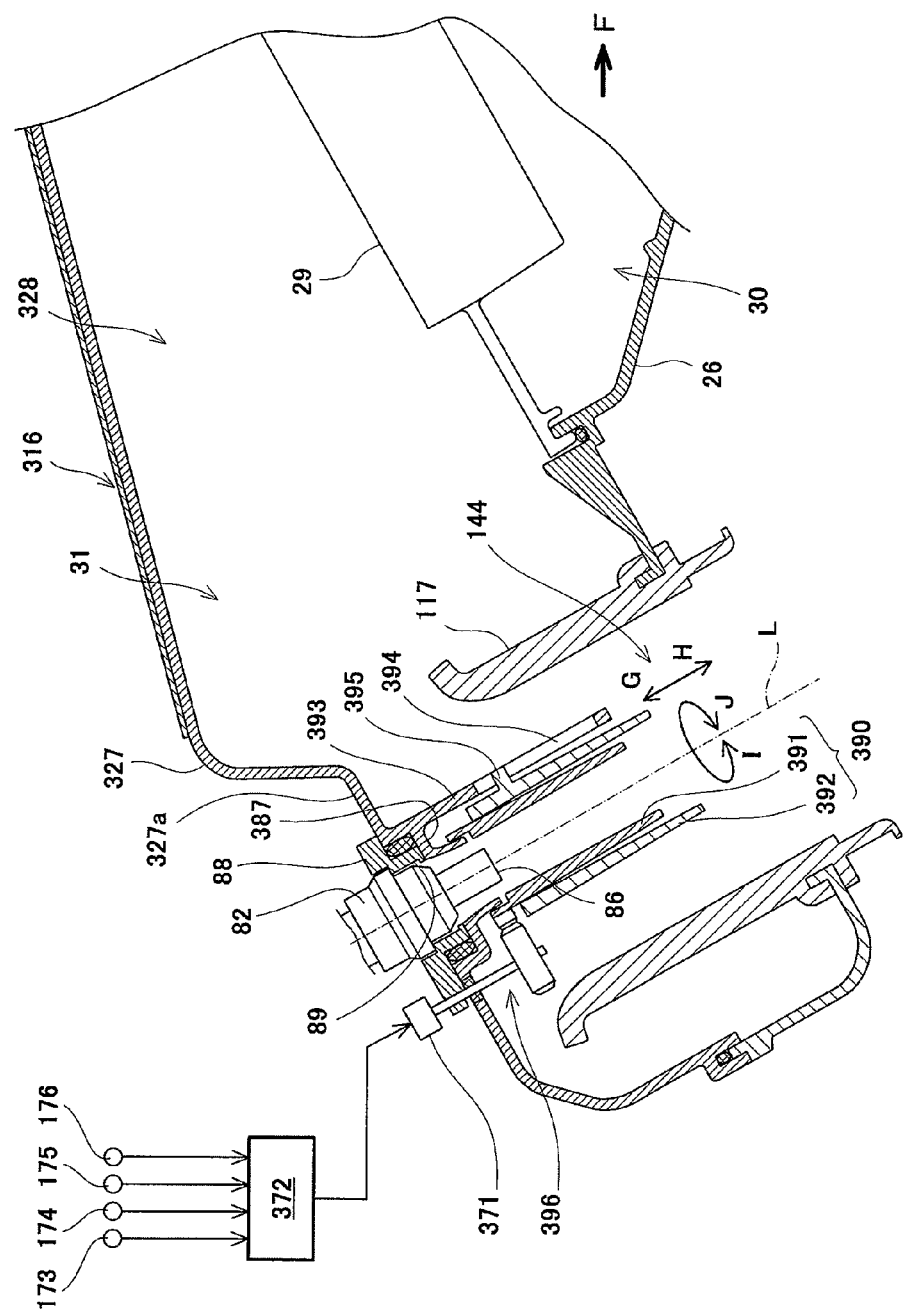
FIG. 16 is a cross-sectional view showing an air-intake structure according to Embodiment 5 of the present invention, as viewed from a right side.

FIG. 16 is cross-sectional view showing an air-intake structure according to Embodiment 5 of the present invention, as viewed from the right side. The same components as those of the above described air-intake structure are designated by the same reference numerals and will not be described.

As shown in FIG. 16, the upstream injector 82 is retained by the boss 89 of the stay 88, and the center axis of the upstream injector 82 substantially conforms to the passage axis L of the inner passage 144 of the air-intake duct 117. A cylindrical first fuel guide member 391 is mounted to an upper case 327 of an air cleaner box 316 such that the first fuel guide member 391 extends from the outer periphery of the lower opening of an injector mounting member 387 toward the air-intake duct 117, is rotatable and is axially unmovable. A male thread is formed on the outer peripheral surface of the first fuel guide member 391. A second fuel guide member 392 provided with a female thread on an inner peripheral surface thereof is threadedly engaged with the outer peripheral side of the first fuel guide member 391. In this embodiment, the fuel guide member 390 includes the first fuel guide member 391 and the second fuel guide member 392.

A flat-plate-shaped guide wall 393 is formed integrally with the upper case 327 such that the guide wall 393 extends along the outer peripheral portion of the lower opening of the injector mounting member 387 toward the air-intake duct 117. The guide wall 393 has a slit 394 extending in parallel with the center axis of the upstream injector 82 and the center axes of the first and second fuel guide members 391 and 392. A guide portion 395 is disposed within the slit 394 so as to protrude from the outer peripheral surface of the second fuel guide member 392. Thus, the rotation of the second fuel guide member 392 is restricted by accommodating the guide portion 395 into the slit 394, while the axial movement thereof is permitted.

A transmission mechanism 396 is connected to the base end portion of the first fuel guide member 391 to transmit a rotational driving force around an axis to the first fuel guide member 391. The components of the transmission mechanism 396 are drawn outside through an upper wall 327a of the upper case 327 of the air cleaner box 316. An extension and retraction operation actuator 371 is provided outside the air cleaner box 316 to feed a rotational driving force to the transmission mechanism 396. The extension and retraction operation actuator 371 is, for example, a power-driven motor.

The motorcycle of this embodiment includes a controller 372 configured to control the operation of the extension and retraction operation actuator 371. The controller 372 receives detection signals as inputs from the sensors for detecting operating states of the engine, for example, the throttle valve opening degree sensor 173, the engine speed sensor 174, the vehicle speed sensor 175, the temperature sensor 176, etc. Based on the received detection signals, the controller 372 controls the extension and retraction operation actuator 371. According to the operation of the extension and retraction operation actuator 371, the first fuel guide member 391 rotates around its axis in the direction of an arrow I or an arrow J, and the second fuel guide member 392 moves in a rotational axis direction as indicated by an arrow G and an arrow H according to the rotational direction of the first fuel guide member 391. Thus, the fuel guide member 390 is extended and retracted.

Since the tip end opening of the fuel guide member 390 moves and the distance from the upstream end opening of the air-intake duct 117 is changed, the passage resistance of the inner passage 144 of the air-intake duct 117 can be adjusted without changing the attitude of the tip-end side injector 82.

The fuel guide member may be extendable and retractable and may be pivotable. In this case, for example, the fuel guide member may be shaped like bellows to achieve extension and retraction, for example. A fuel feed system is not limited to a so-called double injector system, but the present invention is suitably applicable to an engine including only an injector when the injector is positioned upstream of the air-intake duct. Although in Embodiment 3 to Embodiment 5, the air-intake duct which does not have the main passage and the sub-passage is used, the present invention is suitably applicable to the air-intake duct having the main passage and the sub-passage, of course.

As should be appreciated from the above, the present invention achieves a remarkable advantage that an increase in size of the air-intake duct is suppressed and air-intake efficiency is improved. In addition, the present invention achieves a remarkable advantage that back flow of the fuel injected from the injector is prevented. Therefore, the present invention is useful when applied to straddle-type vehicles such as motorcycles, personal watercraft (PWC), or off-road vehicles, which are capable of achieving the advantage.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An air-intake duct configured to guide air to a throttle device coupled to an engine, comprising:
a main wall forming a main passage; and
a sub-wall provided outside the main wall to form a sub-passage;
wherein the sub-wall has a height smaller than a height of the main wall;
wherein the sub-passage is defined by an inner wall surface of the sub-wall and an outer wall surface of the main wall and is disposed on one side in a direction substantially perpendicular to a passage axis of the main passage; and
wherein the main wall protrudes into an inner space of an air cleaner, and the sub-passage is positioned upstream of the main passage in an air flow direction within the air cleaner.

2. An air-intake duct configured to guide air to a throttle device coupled to an engine, comprising:
a main wall forming a main passage; and
a sub-wall provided outside the main wall to form a sub-passage;
wherein the sub-wall has a height smaller than a height of the main wall;
wherein the sub-passage is defined by an inner wall surface of the sub-wall and an outer wall surface of the main wall and is disposed on one side in a direction substantially perpendicular to a passage axis of the main passage; and
wherein the sub-passage has a passage cross section of a crescent shape extending along the outer wall surface of the main wall.

3. An air-intake duct configured to guide air to a throttle device coupled to an engine, comprising:
a main wall forming a main passage; and
a sub-wall provided outside the main wall to form a sub-passage;
wherein the sub-wall has a height smaller than a height of the main wall;
wherein the sub-passage is defined by an inner wall surface of the sub-wall and an outer wall surface of the main wall and is disposed on one side in a direction substantially perpendicular to a passage axis of the main passage;
wherein the sub-passage is joined to the main passage at a downstream side thereof to form a joint passage having a passage cross section of an oval shape; and
wherein the sub-passage is provided to include a part of a long axis of the oval shape as viewed from a passage axis direction of the joint passage.

4. An air-intake structure for guiding air from inside an air cleaner box to a throttle device coupled to an engine via an air-intake duct, the air-intake duct including:
a main wall forming a main passage; and
a sub-wall provided outside the main wall to form a sub-passage;
wherein the sub-wall has a height smaller than a height of the main wall;
wherein the sub-passage is defined by an inner wall surface of the sub-wall and an outer wall surface of the main wall and is disposed on one side in a direction substantially perpendicular to a passage axis of the main passage;
wherein the main wall and the sub-wall of the air-intake duct protrude into an inner space of the air cleaner box;
wherein a protruding amount of the sub-wall into the inner space is smaller than a protruding amount of the main wall into the inner space; and
wherein the air-intake duct is disposed such that the sub-passage is located closer to an air cleaner element inside the air cleaner box than the main passage.

5. The air-intake structure according to claim 4,
wherein the air-intake duct further includes a peripheral wall, an engagement groove formed on an outer peripheral surface of the peripheral wall, a tubular seal portion formed at a downstream end portion of the peripheral wall, and a rear wall protruding from a rear portion of the peripheral wall which is located distant from the air cleaner element inside the air cleaner box;
wherein the main wall has a substantially semi-tubular shape having a height smaller than a height of the rear wall and extends continuously with a front side of the rear wall, and the main passage is defined by an inner wall surface of the main wall and an inner wall surface of the rear wall;
wherein the sub-wall has a substantially semi-tubular shape having a height smaller than a height of the main wall, extends continuously with a front side of the main wall, and protrudes upward from a front portion of the peripheral wall; and wherein the engagement groove is fitted to a peripheral edge of an outlet opening of the air cleaner box in a substantially close contact state, and the tubular seal portion is fitted to an upstream tubular end portion of the throttle device in a substantially close contact state.

6. The air-intake structure according to claim 4, further comprising:

an injector configured to inject a fuel toward an upstream end opening of the air-intake duct; and a fuel guide member configured to surround a fuel injection portion of the injector;

wherein the fuel guide member extends toward the upstream end opening of the air-intake duct.

7. The air-intake structure according to claim 6, wherein the air cleaner box is provided so as to communicate with an upstream side of the air-intake duct; and wherein the injector and the fuel guide member are provided in the air cleaner box.

8. The air-intake structure according to claim 7, wherein the fuel guide member protrudes integrally from the air cleaner box.

9. The air-intake structure according to claim 6, wherein a tip end portion of the fuel guide member is disposed within the air-intake duct.

10. The air-intake structure according to claim 6, wherein the fuel guide member is pivotable around a base end portion thereof.

11. The air-intake structure according to claim 10, further comprising:

a pivot operation actuator configured to pivot the fuel guide member; and a pivot operation controller configured to operate the pivot operation actuator according to an operating state of the engine to pivot the fuel guide member.

12. The air-intake structure according to claim 6, wherein the fuel guide member is extendable and retractable.

13. The air-intake structure according to claim 12, further comprising:

an extension and retraction operation actuator configured to extend and retract the fuel guide member; and an extension and retraction operation controller configured to operate the extension and retraction operation actuator according to an operating state of the engine to extend and retract the fuel guide member.

* * * * *